US012567376B2

(12) United States Patent
Lee et al.

(10) Patent No.: US 12,567,376 B2
(45) **Date of Patent: *Mar. 3, 2026**

(54) CLOCK GENERATOR AND DISPLAY DEVICE INCLUDING THE SAME

(71) Applicant: SAMSUNG DISPLAY CO., LTD., Yongin-si (KR)

(72) Inventors: Sang Hyun Lee, Yongin-si (KR); Si Duk Sung, Yongin-si (KR); Dae Sik Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,092

(22) Filed: Jul. 31, 2024

(65) Prior Publication Data

US 2024/0395217 A1 Nov. 28, 2024

Related U.S. Application Data

(63) Continuation of application No. 18/158,349, filed on Jan. 23, 2023, now Pat. No. 12,080,245, which is a (Continued)

(30) Foreign Application Priority Data

Jan. 17, 2020 (KR) ........................ 10-2020-0006811

(51) Int. Cl.

*G09G 3/3266* (2016.01)
*G09G 3/3275* (2016.01)
*G09G 3/3233* (2016.01)

(52) U.S. Cl.

CPC ......... *G09G 3/3266* (2013.01); *G09G 3/3275* (2013.01); *G09G 3/3233* (2013.01);

(Continued)

(58) Field of Classification Search

CPC .. G09G 3/3266; G09G 3/3275; G09G 3/3233; G09G 2310/0202;

(Continued)

(56) References Cited

U.S. PATENT DOCUMENTS

| | | | | | |
|---|---|---|---|---|---|
| 5,491,519 | A * | 2/1996 | Kim | H04N 19/80 | 375/E7.193 |
| 5,751,362 | A * | 5/1998 | Lee | H04N 19/54 | 375/E7.11 |

(Continued)

FOREIGN PATENT DOCUMENTS

| | | | |
|---|---|---|---|
| CN | 1530903 | A | 9/2004 |
| CN | 101350167 | A | 1/2009 |

(Continued)

OTHER PUBLICATIONS

Extended European Search Report dated Jun. 25, 2021 for corresponding European Application No. 21151835.2 (13 pages).

*Primary Examiner* — Jose R Soto Lopez

(74) *Attorney, Agent, or Firm* — Womble Bond Dickinson (US) LLP

(57) ABSTRACT

A display device includes a display unit including gate lines and pixels electrically coupled to the gate lines; a timing controller configured to generate an on-clock signal, an off-clock signal, an enable signal, and a common signal; a clock generator configured to generate a plurality of clock signals having different phases based on the on-clock signal and the off-clock signal, when the enable signal has a first voltage level, wherein the clock generator is to insert a common pulse into each of the plurality of clock signals based on the common signal, when the enable signal has a second voltage level different from the first voltage level; and a gate driver configured to generate gate signals based (Continued)

on the plurality of clock signals, and to sequentially provide the gate signals to the gate lines.

29 Claims, 18 Drawing Sheets

Related U.S. Application Data continuation of application No. 17/021,430, filed on Sep. 15, 2020, now Pat. No. 11,562,696.

(52) U.S. Cl.
CPC ............... *G09G 2310/0202* (2013.01); *G09G 2310/0254* (2013.01); *G09G 2310/0289* (2013.01); *G09G 2310/08* (2013.01); *G09G 2320/0257* (2013.01); *G09G 2330/02* (2013.01)

(58) Field of Classification Search
CPC ... G09G 2310/0254; G09G 2310/0289; G09G 2310/08; G09G 2320/0257; G09G 2330/02; G09G 2310/0251; G09G 2310/062; G09G 2320/0261; G09G 2320/0295; G09G 3/32; G09G 3/3225; G09G 3/007; G09G 3/2092; G09G 2310/0286; G09G 2310/06
See application file for complete search history.

(56) References Cited

U.S. PATENT DOCUMENTS

| | | | | |
|---|---|---|---|---|
| 6,580,812 | B1 * | 6/2003 | Harrington | G06T 7/246 356/27 |
| 7,446,760 | B2 | 11/2008 | Takada et al. | |
| 8,149,909 | B1 * | 4/2012 | Garbacea | H04N 19/176 375/240.03 |
| 9,262,955 | B2 | 2/2016 | Hwang | |
| 9,886,891 | B2 * | 2/2018 | In | G09G 3/3266 |
| 9,984,641 | B2 | 5/2018 | Kang et al. | |
| 10,269,329 | B2 * | 4/2019 | Cho | G09G 5/18 |
| 10,395,616 | B2 | 8/2019 | Koo et al. | |
| 10,891,903 | B2 | 1/2021 | Takasugi | |
| 11,069,301 | B2 | 7/2021 | Cho et al. | |
| 2002/0176507 | A1 * | 11/2002 | Ju | H04N 19/426 348/718 |
| 2004/0081365 | A1 * | 4/2004 | Carrig, Jr. | G06T 5/20 382/155 |
| 2004/0183792 | A1 * | 9/2004 | Takada | G09G 3/3648 345/204 |
| 2005/0134745 | A1 * | 6/2005 | Bacche | H04N 9/78 348/E5.065 |
| 2007/0132709 | A1 * | 6/2007 | Kawaguchi | G09G 3/3406 345/102 |
| 2009/0021502 | A1 | 1/2009 | Lee et al. | |
| 2009/0160845 | A1 * | 6/2009 | Jang | G09G 3/3677 345/87 |
| 2010/0013755 | A1 * | 1/2010 | Chiou | G09G 3/3648 345/87 |
| 2010/0188571 | A1 * | 7/2010 | Wei Yin | G06T 7/20 348/E7.003 |
| 2010/0207919 | A1 * | 8/2010 | Sawahata | G09G 3/3648 345/96 |
| 2010/0271485 | A1 * | 10/2010 | Kim | H04N 23/635 348/169 |
| 2012/0013652 | A1 * | 1/2012 | Onishi | G09G 3/3426 345/690 |
| 2012/0207218 | A1 * | 8/2012 | Asamura | H04N 19/117 375/E7.125 |
| 2013/0222352 | A1 * | 8/2013 | Jeong | G11C 19/184 345/205 |
| 2014/0347342 | A1 * | 11/2014 | Reithmaier | H03K 19/018521 345/212 |
| 2016/0078804 | A1 * | 3/2016 | Cho | G09G 5/008 345/99 |
| 2016/0080613 | A1 * | 3/2016 | Nagano | H04N 5/144 348/241 |
| 2016/0253938 | A1 * | 9/2016 | Yu | G09G 3/20 345/214 |
| 2016/0300341 | A1 * | 10/2016 | Hay | G06T 7/13 |
| 2016/0351156 | A1 * | 12/2016 | Wu | G11C 19/287 |
| 2017/0083748 | A1 * | 3/2017 | Zhou | G06F 18/211 |
| 2017/0287425 | A1 * | 10/2017 | Koo | G09G 5/18 |
| 2018/0012553 | A1 * | 1/2018 | Kim | G09G 3/3614 |
| 2018/0190218 | A1 * | 7/2018 | Jang | G09G 3/2096 |
| 2018/0288420 | A1 * | 10/2018 | Yu | H04N 19/172 |
| 2018/0322844 | A1 * | 11/2018 | Lee | G09G 5/10 |
| 2019/0043405 | A1 * | 2/2019 | Noh | G09G 3/3674 |
| 2019/0066599 | A1 * | 2/2019 | Kim | H10K 59/124 |
| 2019/0121476 | A1 * | 4/2019 | Jang | G09G 3/20 |
| 2019/0129564 | A1 * | 5/2019 | Kim | G06F 3/04166 |
| 2019/0189060 | A1 * | 6/2019 | Takasugi | G09G 3/3233 |
| 2019/0197964 | A1 * | 6/2019 | Cho | G09G 3/20 |
| 2020/0074933 | A1 * | 3/2020 | Ban | G09G 3/3291 |
| 2020/0081309 | A1 * | 3/2020 | Lee | G09G 3/3607 |
| 2020/0082762 | A1 * | 3/2020 | Takasugi | G09G 3/342 |
| 2021/0174722 | A1 * | 6/2021 | Choi | G09G 3/20 |
| 2021/0201814 | A1 * | 7/2021 | Choi | G09G 3/3275 |

FOREIGN PATENT DOCUMENTS

| | | | |
|---|---|---|---|
| CN | 104517561 | A | 9/2014 |
| CN | 106448528 | A | 2/2017 |
| CN | 109961732 | A | 7/2019 |
| CN | 109961740 | A | 7/2019 |
| KR | 10-1596970 | B1 | 2/2016 |
| KR | 10-2016-0076118 | A | 6/2016 |
| KR | 10-2016-0089648 | A | 7/2016 |
| KR | 10-2016-0092078 | A | 8/2016 |
| KR | 10-2017-0034204 | A | 3/2017 |
| KR | 10-2017-0068073 | A | 6/2017 |
| KR | 10-2017-0114067 | A | 10/2017 |

* cited by examiner

CLKS : CR_CLK, SC_CLK, SS_CLK

CLOCK GENERATOR AND DISPLAY DEVICE INCLUDING THE SAME

CROSS-REFERENCE TO RELATED APPLICATIONS

This application is a continuation of U.S. patent application Ser. No. 18/158,349, filed Jan. 23, 2023, which is a continuation of U.S. patent application Ser. No. 17/021,430, filed Sep. 15, 2020, now U.S. Pat. No. 11,562,696, which claims priority to and the benefit of Korean Patent Application No. 10-2020-0006811, filed Jan. 17, 2020, the entire content of all of which is incorporated herein by reference.

BACKGROUND

1. Field

The present disclosure generally relates to a clock generator and a display device including the same.

2. Related Art

Each pixel of a display device may emit light with a luminance corresponding to a data signal input through a data line. The display device may display a frame image through a combination of lights emitted from the pixels.

When the display device displays a moving image, a dim afterimage may be viewed because a previous image and a current image overlap with each other. In order to prevent a phenomenon (e.g., a motion blur phenomenon) in which an after image is viewed, there has been developed a technology for displaying a black image between frames of a moving image (or a black frame insertion technology).

The display device may generate a plurality of clock signals having different phases by using a level shifter (or clock generator), and a gate driver may generate a scan signal by using the clock signals.

As the resolution and/or driving frequency of the display device increases, a plurality of level shifters may be used, which respectively generate a larger number of clock signals (or clock signals to which the black frame insertion technology is to be applied). As a number of level shifters increases, a number of input signals and related parts (e.g., control signals, lines for transmitting the control signals, and/or input terminals) for individually driving the level shifters increases.

SUMMARY

Example embodiments of the present disclosure provide a clock generator and a display device, which may decrease a number of input signals for clock generation, as well as signal lines and/or input terminals, which are related thereto.

According to one or more example embodiments of the present disclosure, there is provided a display device including a display unit including gate lines and pixels electrically coupled to the gate lines; a timing controller configured to generate an on-clock signal, an off-clock signal, an enable signal, and a common signal; a clock generator configured to generate a plurality of clock signals having different phases based on the on-clock signal and the off-clock signal, when the enable signal has a first voltage level, wherein the clock generator is to insert a common pulse into each of the plurality of clock signals based on the common signal, when the enable signal has a second voltage level different from the first voltage level; and a gate driver configured to generate gate signals, based on the plurality of clock signals, and to sequentially provide the gate signals to the gate lines.

In one or more embodiments, the common signal may include first pulses having a turn-on voltage level, the first pulses being repeated at a first time interval, the on-clock signal may include second pulses having the turn-on voltage level in a period in which the common signal has a turn-off voltage level, and the second pulses may be repeated at a second time interval that is shorter than the first time interval in the period in which the common signal has the turn-off voltage level.

In one or more embodiments, the off-clock signal may include third pulses having the turn-on voltage level in the period in which the common signal has the turn-off voltage level. In one or more embodiments, the off-clock signal may have a phase delayed by p−0.5 times of the second time interval from the on-clock signal, where p is a positive integer.

In one or more embodiments, the clock generator may generate the plurality of clock signals based on triggering of the on-clock signal and the off-clock signal having opposite polarities. In one or more embodiments, the clock generator may generate the plurality of clock signals based on rising edges of the second pulses of the on-clock signal and falling edges of the third pulses of the off-clock signal. In one or more embodiments, rising edges of the plurality of clock signals may appear at the same time as those of the second pulses, and falling edges of the plurality of clock signals may appear at the same time as those of the third pulses.

In one or more embodiments, the common signal may include at least one of the first pulses, when the enable signal has the second voltage level.

In one or more embodiments, the plurality of clock signals output from the clock generator may include a first clock signal and a second clock signal. In one or more embodiments, the first clock signal and the second clock signal may have the common pulse at the same time, when the enable signal has the second voltage level.

In one or more embodiments, the clock generator may include a masking circuit configured to generate a modulated on-clock signal by masking at least some pulses of the on-clock signal based on the enable signal having the second voltage level; a first clock generation circuit configured to generate reference clock signals based on the modulated on-clock signal and the off-clock signal; a second clock generation circuit configured to generate the common pulse based on the enable signal having the second voltage level and the common signal; and a third clock generation circuit configured to generate the plurality of clock signals by inserting the common pulse into the reference clock signals.

In one or more embodiments, at least some of the plurality of clock signals may overlap with a period in which the enable signal has the second voltage level.

In one or more embodiments, the clock generator may include a plurality of level shifters configured to respectively generate some of the plurality of clock signals. In one or more embodiments, the on-clock signal, the off-clock signal, and the common signal may be commonly provided to the plurality of level shifters. In one or more embodiments, the enable signal may be individually provided to the plurality of level shifters.

In one or more embodiments, the enable signal may include a plurality of sub-enable signals. In one or more embodiments, the sub-enable signals may have the same waveform having different phases.

In one or more embodiments, the gate driver may include a plurality of stages configured to respectively generate the gate signals. In one or more embodiments, each stage of the plurality of stages may generate a carry signal based on a previous carry signal of a previous stage and a carry clock signal, and generate a scan signal based on the previous carry signal and a scan clock signal. In one or more embodiments, the scan signal may be included in one or more of the gate signals. In one or more embodiments, the carry clock signal and the scan clock signal may be included in the plurality of clock signals. In one or more embodiments, the clock generator may include a first sub-level shifter configured to generate the scan clock signal based on the on-clock signal, the off-clock signal, the enable signal, and the common signal; and a second sub-level shifter configured to generate the carry clock signal based on the on-clock signal, the off-clock signal, and the enable signal.

In one or more embodiments, the second sub-level shifter may include a masking circuit configured to generate a modulated on-clock signal by masking at least some pulses of the on-clock signal based on the enable signal having the second voltage level; and a first clock generation circuit configured to generate a carry clock signal based on the modulated on-clock signal and the off-clock signal.

In one or more embodiments, the gate driver may concurrently generate the gate signals having a turn-on voltage level, based on the common pulse.

In one or more embodiments, the display device may further include a data driver configured to supply a data signal to the pixels. The data driver may provide a black data signal corresponding to a black image to at least some of the pixels in a period in which the gate signals concurrently have the turn-on voltage level.

According to one or more example embodiments of the present disclosure, there is provided a display device including a display unit including gate lines and pixels electrically coupled to the gate lines; a timing controller configured to generate an on-clock signal, an off-clock signal, an enable signal, and a common signal; a clock generator configured to generate a plurality of clock signals having different phases based on the on-clock signal and the off-clock signal, wherein the clock generator is to insert a common pulse into each of the plurality of clock signals based on the enable signal and the common signal; and a gate driver configured to generate gate signals based on the plurality of clock signals, and to sequentially provide the gate signals to the gate lines, wherein the clock generator includes a common line, an individual line, and a plurality of level shifters to generate the plurality of clock signals, wherein the on-clock signal, the off-clock signal, and the common signal are commonly provided to the plurality of level shifters through the common line, and wherein the enable signal is individually provided to the plurality of level shifters through the individual line.

In one or more embodiments, the gate driver may include a plurality of stages configured to respectively generate the gate signals. In one or more embodiments, each stage of the plurality of stages may generate a carry signal based on a previous carry signal of a previous stage and a carry clock signal, and generate a scan signal, based on the previous carry signal and a scan clock signal. In one or more embodiments, the scan signal may be included in one or more of the gate signals. In one or more embodiments, the carry clock signal and the scan clock signal may be included in the plurality of clock signals. In one or more embodiments, the clock generator may include a first sub-level shifter configured to generate the scan clock signal based on the on-clock signal, the off-clock signal, the enable signal, and the common signal; and a second sub-level shifter configured to generate the carry clock signal based on the on-clock signal, the off-clock signal, and the enable signal.

In one or more embodiments, the first sub-level shifter is to generate the scan clock signal based on a scan on-clock signal, a scan off-clock signal, a scan enable signal, and a scan common signal; and the second sub-level shifter is to generate the carry clock signal based on a carry on-clock signal, a carry off-clock signal, and a carry enable signal.

In one or more embodiments, the first sub-level shifter may include a masking circuit configured to generate a modulated scan on-clock signal by masking at least some pulses of the scan on-clock signal based on the scan enable signal having a second voltage level; a first clock generation circuit configured to generate reference scan clock signals based on the modulated scan on-clock signal and the scan off-clock signal; a second clock generation circuit configured to generate a scan common pulse based on the scan enable signal having the second voltage level and the scan common signal; and a third clock generation circuit configured to generate the scan clock signal by inserting the scan common pulse into the reference scan clock signals.

According to still another example embodiment of the present disclosure, there is provided a clock generator including level shifters configured to generate a plurality of clock signals having different phases based on an on-clock signal and an off-clock signal, wherein the level shifters are configured to insert a common pulse into each of the plurality of clock signals based on an enable signal and a common signal; a common line configured to commonly provide the on-clock signal, the off-clock signal, and the common signal to the level shifters; and an individual line configured to individually provide the enable signal to the level shifters.

In one or more embodiments, each of the level shifters may include a first clock generation circuit configured to generate the plurality of clock signals having different phases based on the on-clock signal and the off-clock signal, when the enable signal has a first voltage level; and a second clock generation circuit configured to insert a common pulse into each of outputs of the first clock generator circuit based on the common signal, when the enable signal has a second voltage level different from the first voltage level.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. It will be understood that when an element is referred to as being "between" two elements, it may be the only element between the two elements, or one or more intervening elements may also be present. Like reference numerals refer to like elements throughout.

DETAILED DESCRIPTION

Figure 1:
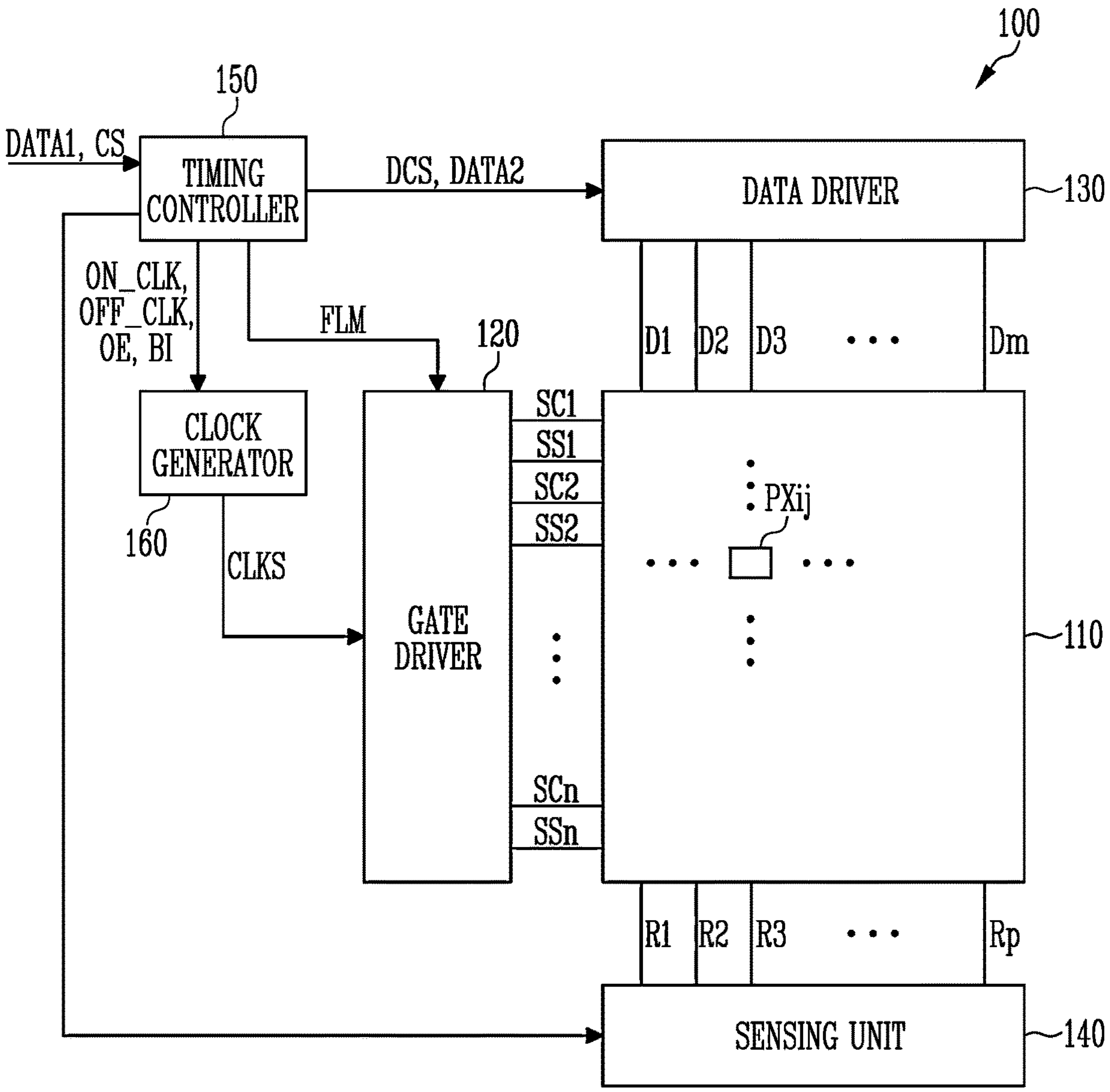
FIG. 1 is a diagram illustrating an example display device, according to one or more embodiments of the present disclosure.

Hereinafter, example embodiments are described in detail with reference to the accompanying drawings so that those skilled in the art may easily practice the present disclosure. The present disclosure may be implemented in various different forms and is not limited to the example embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In the present disclosure, the size and thickness of each component illustrated in the drawings are arbitrarily shown for better understanding and ease of description, but the present disclosure is not limited thereto. Thicknesses of several portions and regions are exaggerated for clear expressions.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

FIG. 1 is a diagram illustrating an example display device according to one or more embodiments of the present disclosure.

Referring to FIG. 1, the display device 100 may include a display unit 110 (or display panel), a gate driver 120 (or scan driver), a data driver 130 (or source driver), a sensing unit 140, a timing controller 150, and a clock generator 160.

The display unit 110 may include gate lines SC1 to SCn and SS1 to SSn (e.g., n is a positive integer), data lines D1 to Dm (e.g., m is a positive integer), sensing lines R1 to Rp (e.g., p is a positive integer less than or equal to m) (or receiving lines), and pixels PXij. The gate lines SC1 to SCn and SS1 to SSn may include scan lines SC1 to SCn and sensing scan lines SS1 to SSn. The pixels PXij may be disposed in areas defined by the scan lines SC1 to SCn and the data lines D1 to Dm.

The pixel PXij may be coupled to at least one of the scan lines SC1 to SCn, at least one of the sensing scan lines SS1 to SSn, one of the data lines D1 to Dm, and one of the sensing lines R1 to Rp. A detailed configuration and operation of the pixel PXij will be described later with reference to FIG. 2.

The gate driver 120 may generate gate signals, based on a start signal FLM (or start pulse) and clock signals CLKS, and provide the gate signals to the gate lines SC1 to SCn and SS1 to SSn. The start signal FLM may be provided from the timing controller 150, and the clock signals CLKS may be provided from the clock generator 160. For example, the gate driver 120 may generate scan signals and sequentially provide the scan signals to the scan lines SC1 to SCn. The gate driver 120 may generate sensing scan signals and sequentially provide the sensing scan signals to the sensing scan lines SS1 to SSn. The scan signals and the sensing scan signals may be included in the gate signals. For example, the gate driver 120 may include shift registers (or stages). A detailed configuration of the gate driver 120 will be described later with reference to FIG. 5.

The data driver 130 may generate data signals, based on image data DATA2 and a data control signal DCS received from the timing controller 150, and provide the data signals to the display unit 110 (or the pixels PXij) through the data lines D1 to Dm. The data control signal DCS is a signal for controlling an operation of the data driver 130, and may include a load signal (or data enable signal) to instruct the data driver 130 to output of a valid data signal, and the like. For example, the data driver 130 may sample grayscale values included in the image data DATA2, and provide data signals corresponding to the grayscale values to the data lines D1 to Dm in a unit of a pixel row.

In one or more embodiments, the data driver 130 sequentially outputs valid data signals, corresponding to the gate lines SC1 to SCn and SS1 to SSn during one frame (or frame period), and may periodically output a black data signal corresponding to a black color between the data signals. The pixel PXij may sequentially receive (and record) one of the valid data signals and at least one black data signal during one frame.

The sensing unit 140 may measure characteristic information of the pixel PXij, based on a current or voltage received through the sensing lines R1 to Rp. For example, the sensing unit 140 may receive current and voltage information of the pixel PXij from the display unit 110 through the sensing lines R1 to Rp and measure characteristic information of the pixel PXij based on the received current or voltage information. For example, the characteristic information of the pixel PXij may include mobility information and threshold voltage information of a driving transistor included in the pixel PXij, degradation information of a light emitting device included in the pixel PXij, and the like.

The timing controller 150 may receive input image data DATA1 and a control signal CS from the outside (e.g., a graphic processor), generate a gate control signal and the data control signal DCS, based on the control signal CS, and generate the image data DATA2 by converting the input image data DATA1. The gate control signal may include the start signal FLM, an on-clock signal ON_CLK, an off-clock signal OFF_CLK, an enable signal OE, and a common signal BI. The on-clock signal ON_CLK and the off-clock signal OFF_CLK may be reference clock signals used to generate the clock signals CLKS in the clock generator 160 (or level shifter), and the enable signal OE and the common signal BI may be used to implement a black frame insertion technology, e.g., to determine a timing at which the black data signal provided from the data driver 130 is stored in the pixel PXij. The on-clock signal ON_CLK, the off-clock signal OFF_CLK, and the common signal BI will be described later with reference to FIGS. 9 and 10.

The clock generator 160 may generate the clock signals CLKS, based on the on-clock signal ON_CLK, the off-clock signal OFF_CLK, the enable signal OE, and the common signal BI.

In one or more embodiments, the clock generator 160 may generate the clock signals CLKS having different phases, based on the on-clock signal ON_CLK and the off-clock signal OFF_CLK when the enable signal OE has a first voltage level (e.g., a logic low level), and insert a common pulse into each of the clock signals CLKS, based on the common signal BI when the enable signal OE has a second voltage level (e.g., a logic high level) different from the first voltage level. For example, the clock signals CLKS may include pulses having different phases in a period in which the enable signal OE has the first voltage level, and include the common pulse having the same phase in a period in which the enable signal OE has the second voltage level.

Although a case where the clock generator 160 is independent from the gate driver 120 is illustrated in FIG. 1, the present disclosure is not limited thereto, and the clock generator 160 may be integrally implemented with the gate driver 120 or may be included in the gate driver 120.

Hereinafter, a configuration and operation of the pixel PXij and a configuration of the gate driver 120 will be described, and then a configuration and operation of the clock generator 160 will be described in detail.

Figure 2:
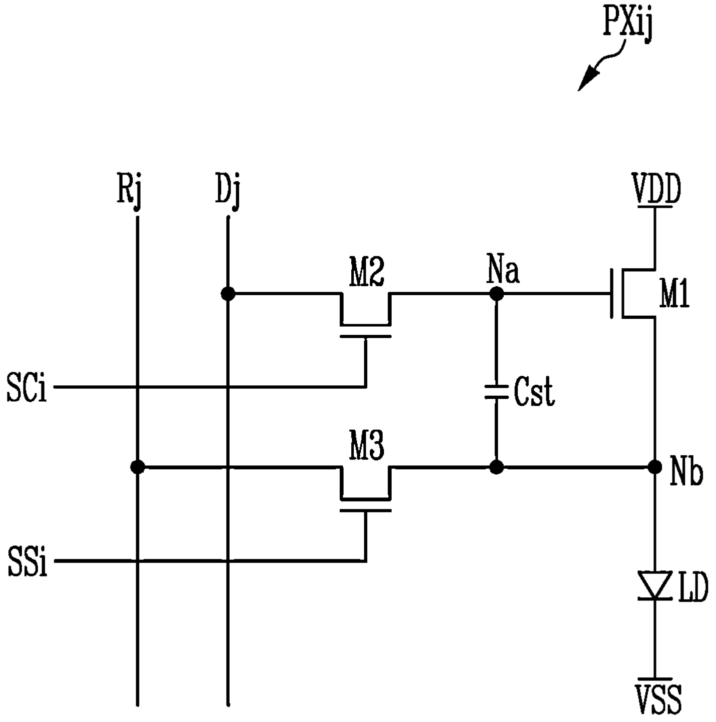
FIG. 2 is an example circuit diagram illustrating an example of a pixel included in the display device shown in FIG. 1, according to one or more embodiments of the present disclosure.

FIG. 2 is a circuit diagram illustrating an example of the pixel included in the display device shown in FIG. 1, according to one or more embodiments of the present disclosure.

Referring to FIG. 2, the pixel PXij may include thin film transistors (TFTs) M1, M2, and M3 (e.g., switching elements or transistors), a storage capacitor Cst, and a light emitting device LD. The thin film transistors M1, M2, and M3 may be N-type transistors.

A gate electrode of a first thin film transistor M1 may be coupled to a gate node Na, one electrode (or first electrode) of the first thin film transistor M1 may be coupled to a first power line VDD (or first power source), and the other electrode (or second electrode) of the first thin film transistor M1 may be coupled to a source node Nb. The first thin film transistor M1 may be referred to as a driving transistor.

A gate electrode of a second thin film transistor M2 may be coupled to a scan line SCi, one electrode of the second thin film transistor M2 may be coupled to a data line Dj, and the other electrode of the second thin film transistor M2 may be coupled to the gate node Na. The second thin film transistor M2 may be referred to as a switching transistor, a scan transistor, or the like.

A gate electrode of a third thin film transistor M3 may be coupled to a sensing scan line SSi, one electrode of the third thin film transistor M3 may be coupled to a sensing line Rj, and the other electrode of the third thin film transistor M3 may be coupled to the source node Nb. The third thin film transistor M3 may be referred to as an initialization transistor, a sensing transistor, or the like.

One electrode of the storage capacitor Cst may be coupled to the gate node Na, and the other electrode of the storage capacitor Cst may be coupled to the source node Nb.

An anode of the light emitting device LD may be coupled to the source node Nb, and a cathode of the light emitting device LD may be coupled to a second power line VSS (or second power source). The light emitting device LD may be configured as an organic light emitting diode (OLED), an inorganic light emitting diode, or the like.

A first power voltage may be provided to the first power line VDD, and a second power voltage may be provided to the second power line VSS. The first and second power voltages are voltages suitable for an operation of the pixel PXij, and the first power voltage may have a voltage level higher than that of the second power voltage.

Figure 3:
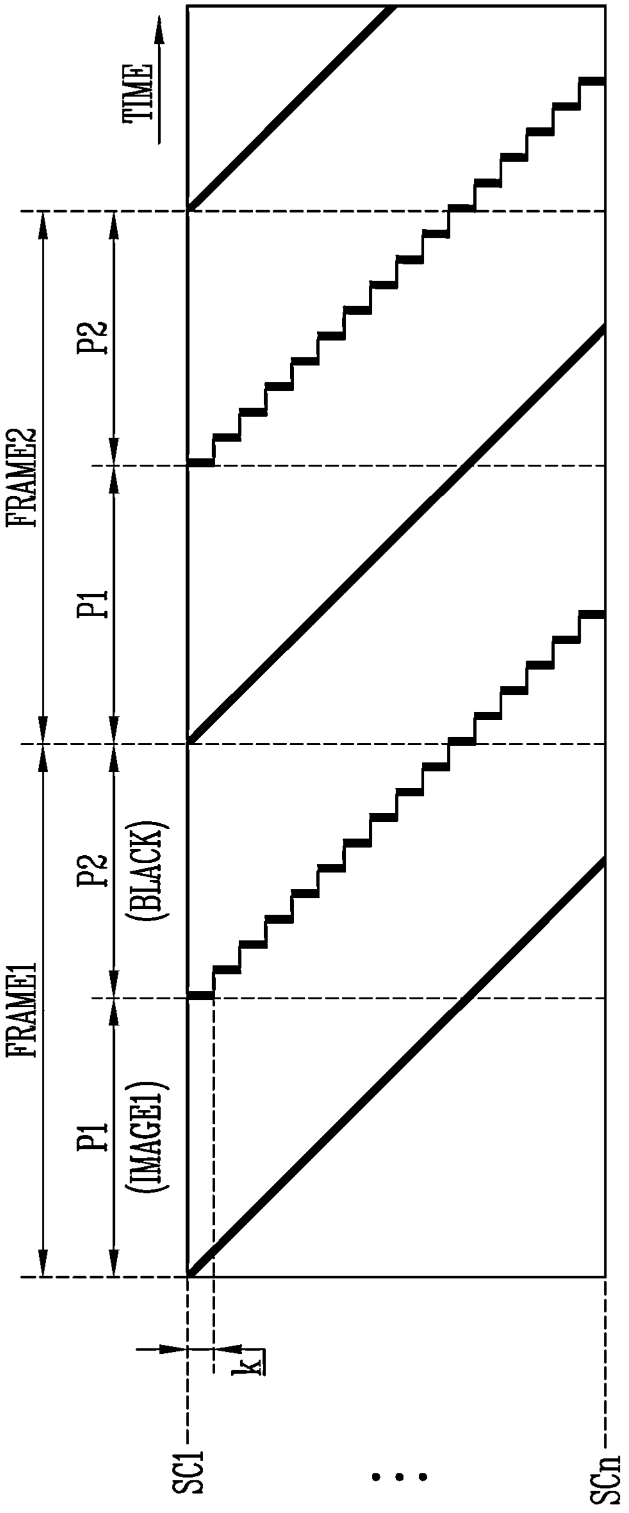
FIG. 3 is a diagram illustrating an example operation of a display unit included in the display device shown in FIG. 1, according to one or more embodiments of the present disclosure.

FIG. 3 is a diagram illustrating an operation of the display unit included in the display device shown in FIG. 1, according to one or more embodiments of the present disclosure. Signals provided to pixels corresponding to the scan lines SC1 to SCn according to time TIME are illustrated in FIG. 3.

Referring to FIGS. 1-3, each of frame periods FRAME1 and FRAME2 may include a first period P1 and a second period P2. The first period P1 may be a period in which the pixel PXij (see FIG. 1) emits light with a luminance corresponding to a valid data signal IMAGE1, and the second period P2 may be a period in which the pixel PXij emits light with a black color and a low luminance, corresponding to a black data signal BLACK or does not emit light.

In one or more embodiments, at a start time of the first period P1, a scan signal (or first scan pulse) having a turn-on level may be provided to a pixel coupled to a first scan line SC1 through the first scan line SC1. The turn-on voltage level is a voltage level which allows transistors (e.g., M1, M2, M3) in the pixel to be turned on. For example, the turn-on voltage level may be a voltage level which allows the second thin film transistor M2 described with reference to FIG. 2 to be turned on. The pixel coupled to the first scan line SC1 may emit light with a valid luminance during the first period P1.

As shown in FIG. 3, the scan signal (or first scan pulse) having a turn-on voltage may be sequentially provided to the scan lines SC1 to SCn, and pixels corresponding to the scan lines SC1 to SCn may sequentially emit light.

In one or more embodiments, at a start time of the second period P2, a scan signal (or second scan pulse) having a turn-on voltage level may be provided to the pixel coupled to the first scan line SC1 through the first scan line SC1. The pixel coupled to the first scan line SC1 may store a black data signal, and emit light with a black color and a low luminance in response to the black data signal during the second period P2.

As shown in FIG. 3, the scan signal (or second scan pulse) having a turn-on voltage may be commonly provided to k (k is an integer of two or more) among the scan lines SC1 to SCn, and be entirely provided to the scan lines SC1 to SCn in the form of steps. For example, the scan signal (or second scan pulse) may provide a turn-on voltage to the scan lines SC1 to SCn in the form of a step voltage signal, where each step may have a magnitude k, where k is an integer greater than or equal to two. A scan time for providing the same black data signal to the pixels may be decreased.

As described with reference to FIG. 3, the display device 100 may control the pixel to validly emit light during the first period P1 of the one frame period, and control the pixel to emit light corresponding to a black image or not to emit light during the second period P2 of the one frame period. For example, the display device 100 may control the pixel to emit light having a luminance corresponding to a valid data signal IMAGE1 during the first period P1 of the one frame period, and may also control the pixel to emit a black color light having a low luminance corresponding to a black data signal BLACK or does not emit light during the second period P2 of the one frame period. For example, the display device 100 may be driven using a black frame insertion technology.

Figure 4A:
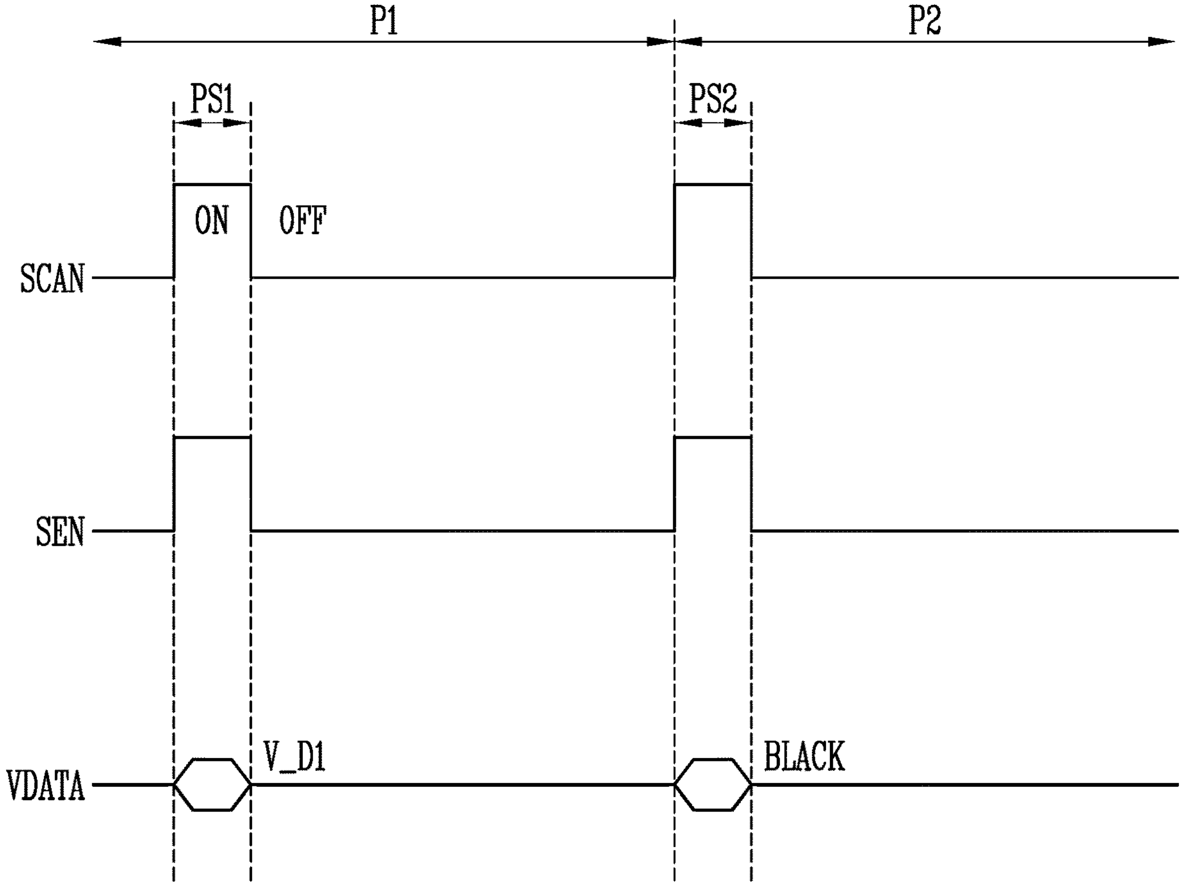
FIGS. 4A and 4B are waveform diagrams illustrating an example operation of the pixel shown in FIG. 2, according to one or more embodiments of the present disclosure.
Figure 4B:
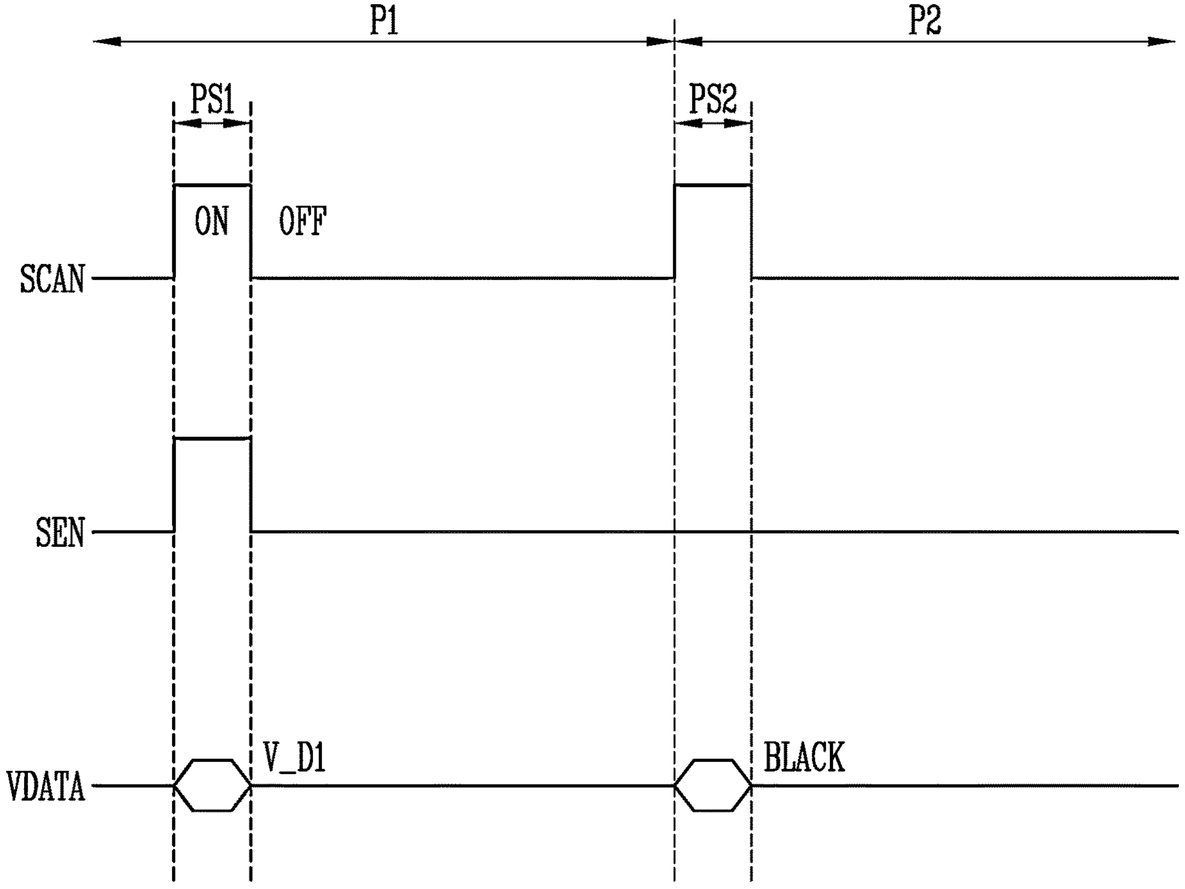

FIGS. 4A and 4B are waveform diagrams illustrating an operation of the pixel shown in FIG. 2.

First, referring to FIGS. 2-4A, a first frame FRAME1 may include a first period P1 and a second period P2.

During a first sub-period PS1 of the first period P1, a scan signal SCAN (or first scan pulse) having a turn-on voltage level may be applied to the scan line SCi, and a sensing scan signal SEN (or first sensing scan pulse) having a turn-on voltage level may be applied to the sensing scan line SSi. In one or more embodiments, a data signal VDATA corresponding to a specific grayscale value may be applied to the data line Dj during the first sub-period PS1 of the first period P1. For example, the data signal VDATA may have a first valid data voltage V_D1.

The second thin film transistor M2 may be turned on in response to the scan signal SCAN, and the data signal VDATA may be provided to the one electrode of the storage capacitor Cst. In one or more embodiments, the third thin film transistor M3 may be turned on in response to the sensing scan signal SEN, and a first reference voltage applied to the sensing line Rj may be provided to the other electrode of the storage capacitor Cst. Therefore, a voltage corresponding to a difference between the data signal VDATA and the first reference voltage may be stored in the storage capacitor Cst. Subsequently, when the second thin film transistor M2 and the third thin film transistor M3 are turned off, an amount of driving current flowing through the first thin film transistor M1 may be determined corresponding to the voltage (e.g., the first valid data voltage V_D1) stored in the storage capacitor Cst, and the light emitting device LD may emit light with a luminance corresponding to the amount of driving current during the first period P1.

Similarly, during a second sub-period PS2 of the second period P2, a scan signal SCAN (or second scan pulse) having a turn-on voltage level may be applied to the scan line SCi, and a sensing scan signal SEN (or second sensing scan pulse) having a turn-on voltage level may be applied to the sensing scan line SSi. A data signal VDATA applied to the data line Dj during the second sub-period PS2 of the second period P2 may have a black data voltage (i.e., a black data signal BLACK) corresponding to a black color. Therefore, the light emitting device LD may emit a black color light or may not emit light during the second period P2.

Meanwhile, although a case where the sensing scan signal SEN has a turn-on voltage level in the second sub-period PS2 of the second period P2 is illustrated in FIG. 4A, the present disclosure is not limited thereto.

For example, as shown in FIG. 4B, the sensing scan signal SEN may have a turn-off voltage level in the second sub-period PS2. A data signal VDATA (i.e., a black data signal BLACK) may be provided to the one electrode of the storage capacitor Cst in response to the scan signal SCAN during the second sub-period PS2, and the first thin film transistor M1 may be turned off. The storage capacitor Cst maintains the black data signal BLACK during the second period P2, so that a turn-off state of the first thin film transistor M1 may be maintained.

Figure 5:
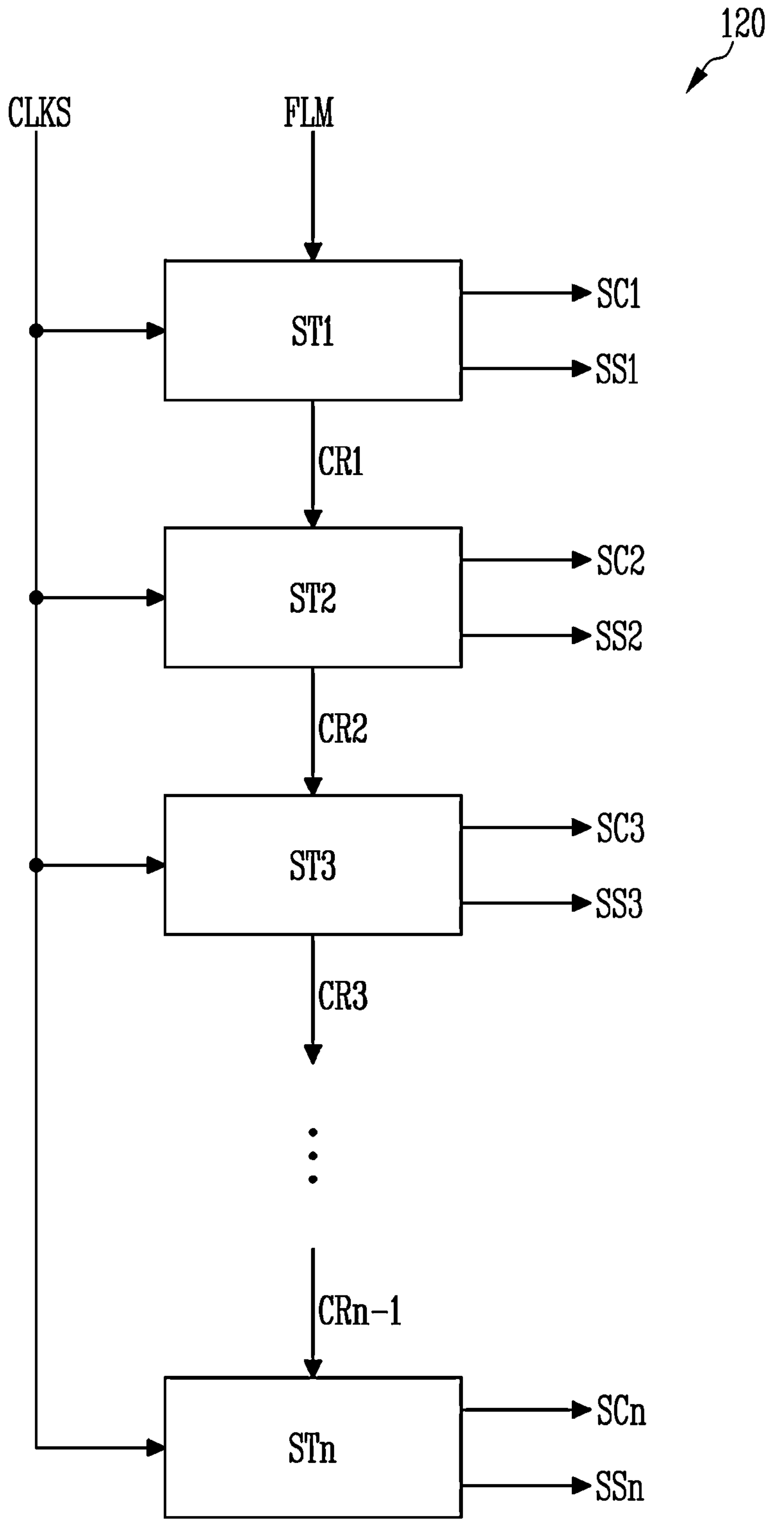
FIG. 5 is a diagram illustrating an example of a gate driver included in the display device shown in FIG. 1, according to one or more embodiments of the present disclosure.

FIG. 5 is a diagram illustrating an example of the gate driver include in the display device shown in FIG. 1.

Referring to FIG. 5, the gate driver 120 may include a plurality of stages ST1 to STn. The stages ST1 to STn may correspond to or may be coupled to the scan lines SC1 to SCn (and the sensing scan lines SS1 to SSn) described with reference to FIG. 1, respectively.

The stages ST1 to STn may be coupled to clock lines and receive clock signals CLKS. Although will be described later with reference to FIG. 9, each of the stages ST1 to STn may be coupled to corresponding clock lines (e.g., two clock lines) from among the clock lines, and receive corresponding clock signals (e.g., two clock signals) from among the clock signals CLKS.

Each of the stages ST1 to STn may receive a start signal FLM or a carry signal (e.g., one of carry signals CR1 to CRn−1) of a previous stage, and generate a scan signal and a sensing scan signal by shifting the start signal FLM or the carry signal of the previous stage, based on the corresponding clock signals CLKS. In one or more other embodiments, each of the stages ST1 to STn may output a corresponding clock signal among the clock signals CLKS as a scan signal and/or a sensing scan signal, in response to a start signal FLM or a carry signal (e.g., one of carry signals CR1 to CRn−1) of a previous stage.

Each of the stages ST1 to STn may be coupled to corresponding ones of the scan lines SC1 to SCn, the sensing scan lines SS1 to SSn, and carry lines.

For example, a first stage ST1 may be coupled to the first scan line SC1, a first sensing scan line SS1, and a first carry line, a second stage ST2 may be coupled to a second scan line SC2, a second sensing scan line SS2, and a second carry line, and a third stage ST3 may be coupled to a third scan line SC3, a third sensing scan line SS3, and a third carry line. An nth stage STn may be coupled to an nth scan line SCn and an nth sensing scan line SSn.

Clock signals generated by the stages ST1 to STn may be respectively applied to the scan lines SC1 to SCn, the sensing scan lines SS1 to SSn, and the carry lines.

In one or more embodiments, although a case where each of the stages ST1 to STn receives a carry signal from a previous stage most adjacent thereto is illustrated in FIG. 5, the stages ST1 to STn are not limited thereto. For example, each of the stages ST1 to STn may receive a carry signal from a previous stage located prior to two stages.

Figure 6:
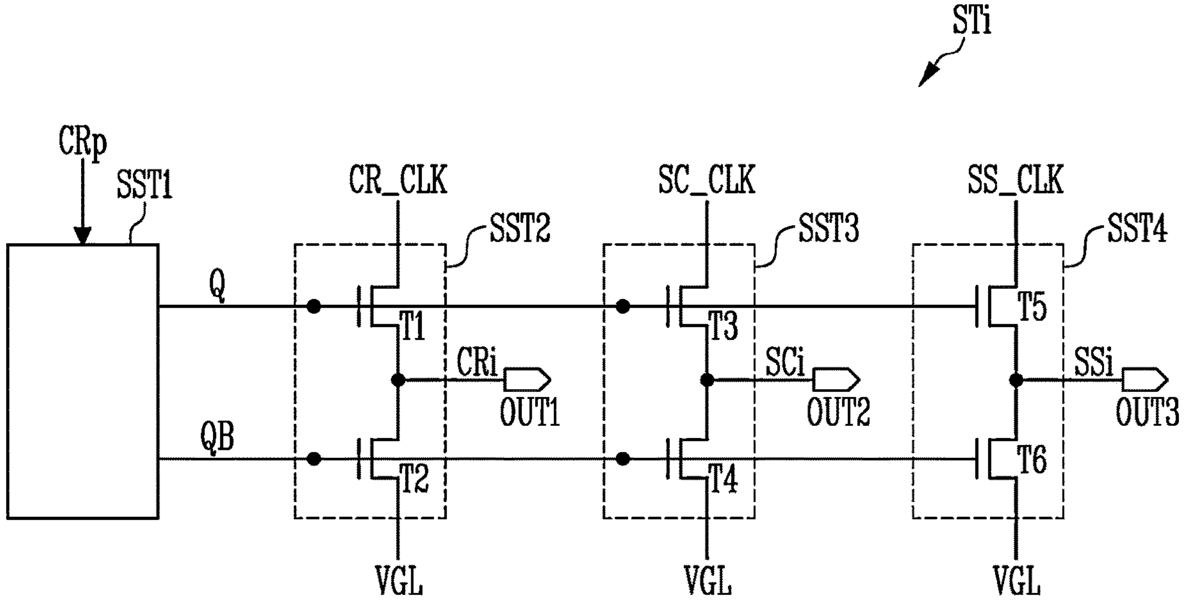
FIG. 6 is a diagram illustrating an example of a stage included in the gate driver shown in FIG. 5, according to one or more embodiments of the present disclosure.

FIG. 6 is a diagram illustrating an example of the stage included in the gate driver shown in FIG. 5. The stages ST1 to STn shown in FIG. 5 are substantially identical to one another, and therefore, a stage STi will be described, including the stages ST1 to STn.

Referring to FIG. 6, the stage STi may include a node control circuit SST1, a first output circuit SST2, a second output circuit SST3, and a third output circuit SST4. The clock signals CLKS may include a carry clock signal CR_CLK, a scan clock signal SC_CLK, and a sensing clock signal SS_CLK. The carry clock signal CR_CLK, the scan clock signal SC_CLK, and the sensing clock signal SS_CLK may be identical to or different from each other.

The node control circuit SST1 may control a node voltage (i.e., a first node voltage) of a first node Q and a node voltage (i.e., a second node voltage) of a second node QB, based on a previous carry signal CRp (e.g., p is a positive integer) of a previous stage (or based on a start signal FLM) and the clock signals CLKS. For example, when the previous carry signal CRp has a turn-off voltage level, the node control circuit SST1 may control the second node QB such that the second node voltage of the second node QB has a turn-on voltage level, and control the first node Q such that the first node voltage of the first node Q is maintained at a turn-off voltage level. For example, when the previous carry signal CRp has a turn-on voltage level, the node control circuit SST1 may control the first node Q such that the first node voltage of the first node Q has a turn-on voltage level, and control the second node QB such that the second node voltage of the second node QB is maintained at a turn-off voltage level.

The first output circuit SST2 may output the carry clock signal CR_CLK as a carry signal CRi through a first output terminal OUT1 in response to the first node voltage of the first node Q, and pull-down the carry signal CRi to a low voltage VGL (or turn-off voltage) or maintain the carry signal CRi in response to the second node voltage of the second node QB. The first output circuit SST2 may include a first transistor T1 and a second transistor T2. The first transistor T1 may include a first electrode receiving the carry clock signal CR_CLK, a second electrode coupled to the first output terminal OUT1, and a gate electrode coupled to the first node Q. The second transistor T2 may include a first electrode coupled to the first output terminal OUT1, a second electrode coupled to the low voltage VGL, and a gate electrode coupled to the second node QB.

The second output circuit SST3 may output the scan clock signal SC_CLK as a scan signal to a second output terminal OUT2 (or scan line SCi) in response to the first node voltage of the first node Q, and pull-down the scan signal to the low voltage VGL or maintain the scan signal in response to the second node voltage of the second node QB. The second output circuit SST3 may include a third transistor T3 and a fourth transistor T4. The third transistor T3 may include a first electrode receiving the scan clock signal SC_CLK, a second electrode coupled to the second output terminal OUT2, and a gate electrode coupled to the first node Q. The fourth transistor T4 may include a first electrode coupled to the second output terminal OUT2, a second electrode coupled to the low voltage VGL, and a gate electrode coupled to the second node QB.

The scan signal and the carry signal CRi may have different waveforms, and therefore, the scan clock signal SC_CLK distinguished from the carry clock signal CR_CLK may be used. In one or more embodiments, the second output circuit SST3 distinguished from the first output circuit SST2 may be provided in the stage STi.

In one or more embodiments, similar to the second output circuit SST3, the third output circuit SST4 may output the sensing clock signal SS_CLK as a sensing scan signal to a third output terminal OUT3 (or sensing scan line SSi) in response to the first node voltage of the first node Q, and pull-down the sensing scan signal to the low voltage VGL or maintain the sensing scan signal in response to the second node voltage of the second node QB. The third output circuit SST4 may include a fifth transistor T5 and a sixth transistor T6. The fifth transistor T5 may include a first electrode receiving the sensing clock signal SS_CLK, a second electrode coupled to the third output terminal OUT3, and a gate electrode coupled to the first node Q. The sixth transistor T6 may include a first electrode coupled to the third output terminal OUT3, a second electrode coupled to the low voltage VGL, and a gate electrode coupled to the second node QB.

The sensing scan signal and the scan signal may have different waveforms, and therefore, the sensing clock signal SS_CLK distinguished from the scan clock signal SC_CLK may be used. In one or more embodiments, the third output circuit SST4 distinguished from the second output circuit SST3 may be provided in the stage STi.

As described with reference to FIGS. 5-6, the gate driver 120 (or the stage STi) may generate a carry signal, a scan signal, and a sensing scan signal by using various clock signals CR_CLK, SC_CLK, and SS_CLK.

Figure 7:
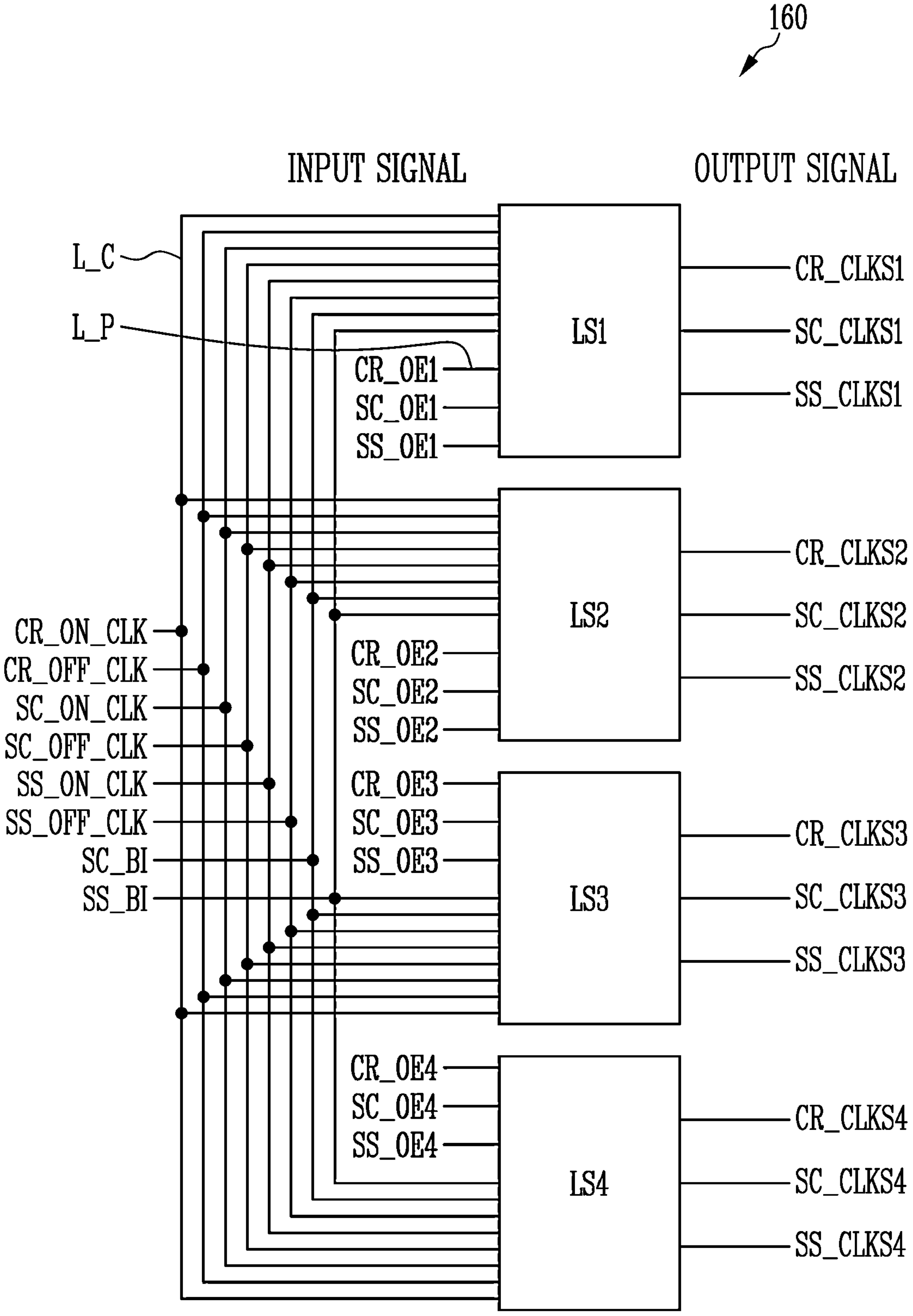
FIG. 7 is a diagram illustrating an example of a clock generator included in the display device shown in FIG. 1, according to one or more embodiments of the present disclosure.
Figure 8:
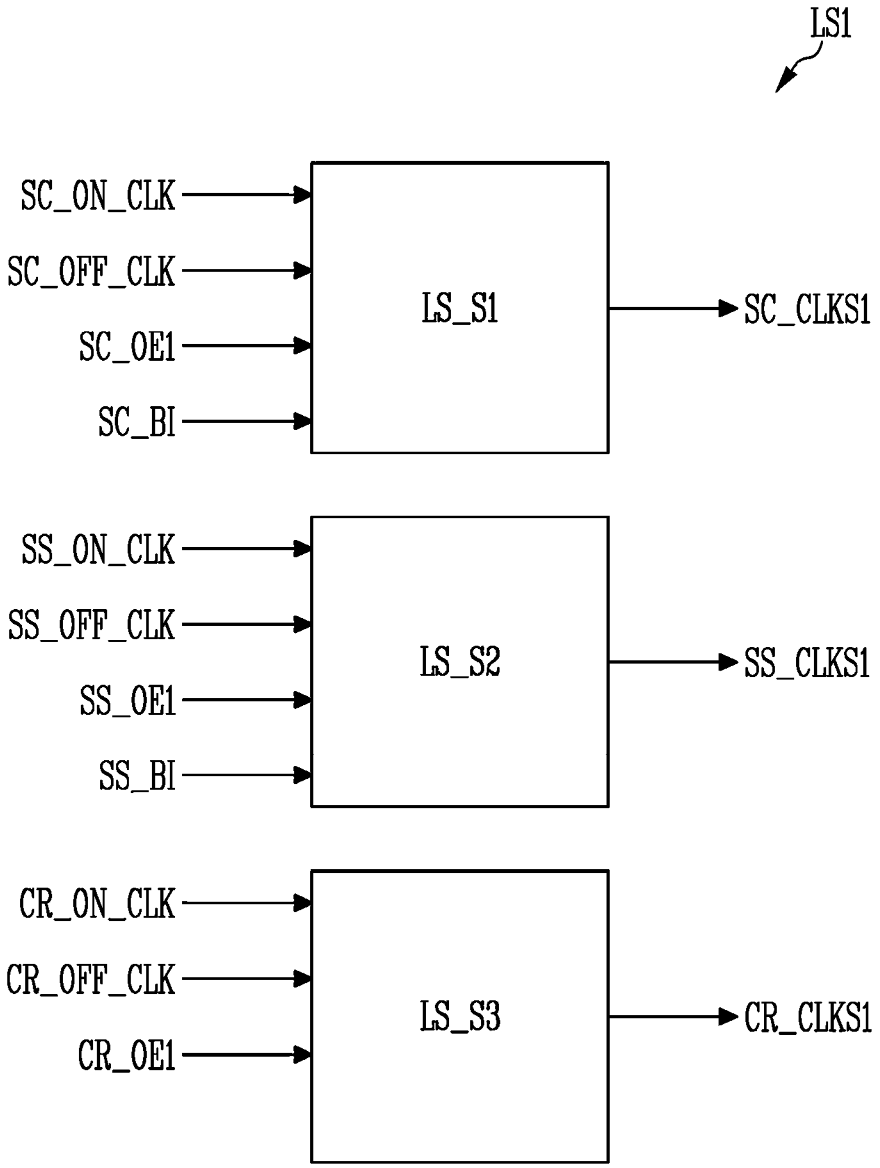
FIG. 8 is a diagram illustrating an example of a first level shifter included in the clock generator shown in FIG. 7, according to one or more embodiments of the present disclosure.

FIG. 7 is a diagram illustrating an example of the clock generator included in the display device shown in FIG. 1, according to one or more embodiments of the present disclosure. FIG. 8 is a diagram illustrating an example of a first level shifter included in the clock generator shown in FIG. 7, according to one or more embodiments of the present disclosure.

Referring to FIGS. 1 and 7, the clock generator 160 may include a plurality of level shifters LS1 to LS4. For example, although a case where the clock generator 160 includes four level shifters LS1 to LS4 is illustrated, the clock generator 160 is not limited thereto. For example, the clock generator 160 may include two, three, five or more level shifters.

First to fourth level shifters LS1 to LS4 may be coupled to each other through common lines L_C, and receive an on-clock signal, an off-clock signal, and a common signal through the common lines L_C from the timing controller 150 (see FIG. 1).

For example, the on-clock signal may include a carry on-clock signal CR_ON_CLK, a scan on-clock signal SC_ON_CLK, and a sensing on-clock signal SS_ON_CLK, the off-clock signal may include a carry off-clock signal CR_OFF_CLK, a scan off-clock signal SC_OFF_CLK, and a sensing off-clock signal SS_OFF_CLK, and the common signal may include a scan common signal SC_BI and a sensing common signal SS_BI. Each of the first to fourth level shifters LS1 to LS4 may receive the carry on-clock signal CR_ON_CLK, the scan on-clock signal SC_ON_CLK, the sensing on-clock signal SS_ON_CLK, the carry off-clock signal CR_OFF_CLK, the scan off-clock signal SC_OFF_CLK, the sensing off-clock signal SS_OFF_CLK, the scan common signal SC_BI, and the sensing common signal SS_BI through the common lines L_C.

Also, each of the first to fourth level shifters LS1 to LS4 may receive a carry enable signal, a scan enable signal, and a sensing enable signal through individual lines L_P from the timing controller 150 (see FIG. 1).

For example, the first level shifter LS1 may receive a first carry enable signal CR_OE1, a first scan enable signal SC_OE1, and a first sensing enable signal SS_OE1. The second level shifter LS2 may receive a second carry enable signal CR_OE2, a second scan enable signal SC_OE2, and a second sensing enable signal SS_OE2. The third level shifter LS3 may receive a third carry enable signal CR_OE3, a third scan enable signal SC_OE3, and a third sensing enable signal SS_OE3. The fourth level shifter LS4 may receive a fourth carry enable signal CR_OE4, a fourth scan enable signal SC_OE4, and a fourth sensing enable signal SS_OE4.

Each of the first to fourth level shifters LS1 to LS4 may generate clock signals, based on an on-clock signal, an off-clock signal, a common signal, and an enable signal, and output the clock signals as an output signal OUTPUT SIGNAL.

Because the first to fourth level shifters LS1 to LS4 are substantially identical or similar to one another, the first level shifter LS1 will be described, including the first to fourth level shifters LS1 to LS4.

Referring to FIG. 8, the first level shifter LS1 may include a first sub-level shifter LS_S1, a second sub-level shifter LS_S2, and a third sub-level shifter LS_S3.

The first sub-level shifter LS_S1 may generate first scan clock signals SC_CLKS1, based on the scan on-clock signal SC_ON_CLK, the scan off-clock signal SC_OFF_CLK, the first scan enable signal SC_OE1, and the scan common signal SC_BI.

Similarly, the second sub-level shifter LS_S2 may generate first sensing clock signals SS_CLKS1, based on the sensing on-clock signal SS_ON_CLK, the sensing off-clock signal SS_OFF_CLK, the first sensing enable signal SS_OE1, and the sensing common signal SS_B1.

The third sub-level shifter LS_S3 may generate first carry clock signals CR_CLKS1, based on the carry on-clock signal CR_ON_CLK, the carry off-clock signal CR_OFF_CLK, and the first carry enable signal CR_OE1.

Similar to the first level shifter LS1, the second level shifter LS2 may generate second carry clock signals CR_CLKS2, second scan clock signals SC_CLKS2, and second sensing clock signals SS_CLKS2, the third level shifter LS3 may generate third carry clock signals CR_CLKS3, third scan clock signals SC_CLKS3, and third sensing clock signals SS_CLKS3, and the fourth level shifter LS4 may generate fourth carry clock signals CR_CLKS4, fourth scan clock signals SC_CLKS4, and fourth sensing clock signals SS_CLKS4.

The first to fourth scan clock signals SC_CLKS1 to SC_CLKS4 are included in carry clock signals, have the same waveform, and may have different phases. Similarly, the first to fourth sensing clock signals SS_CLKS1 to SS_CLKS4 are included in sensing clock signals, have the same waveform, and may have different phases.

When the first to fourth level shifters LS1 to LS4 respectively receive scan on-clock signals and scan off-clock signals, which have different phases, to generate scan clock signals SC_CLKS1, SC_CLKS2, SC_CLKS3, and SC_CLKS4 having different phases, each of a number of input terminals of the clock generator 160 for receiving the signals (and a number of output terminals of the timing controller 150 for outputting the signals) and a number of lines (e.g., common lines L_C) may be eight, and the number of lines may increase in proportion to a number of level shifters as the number of level shifters increases. The first to fourth level shifters LS1 to LS4 according to one or more embodiments of the present disclosure receive the on-clock signal, the off-clock signal, and the common signal through the common lines L_C, so that the number of input terminals of the clock generator 160 and the number of lines may decrease. Meanwhile, the clock generator 160 (or the first to fourth level shifters LS1 to LS4) may internally (or autonomously) generate each of the scan on-clock signals having different phases and the scan off-clock signals having different phases, by using individually received scan enable signals SC_OE1, SC_OE2, SC_OE3, and SC_OE4.

As described with reference to FIGS. 7 and 8, the first to fourth level shifters LS1 to LS4 commonly receive an on-clock signal, an off-clock signal, and a common signal among input signals INPUT SIGNAL through the common lines L_C, and individually receives only an enable signal from among the input signals INPUT SIGNAL through the individual lines L_P. Thus, the number of input terminals of the clock generator 160 including the first to fourth level shifters LS1 to LS4, the number of output terminals of the timing controller 150, which corresponds to the number of input terminals of the clock generator 160, the number of lines coupling the input terminals of the clock generator 160 and the output terminals of the timing controller 150 to each other, and/or the like, may decrease.

Figure 9:
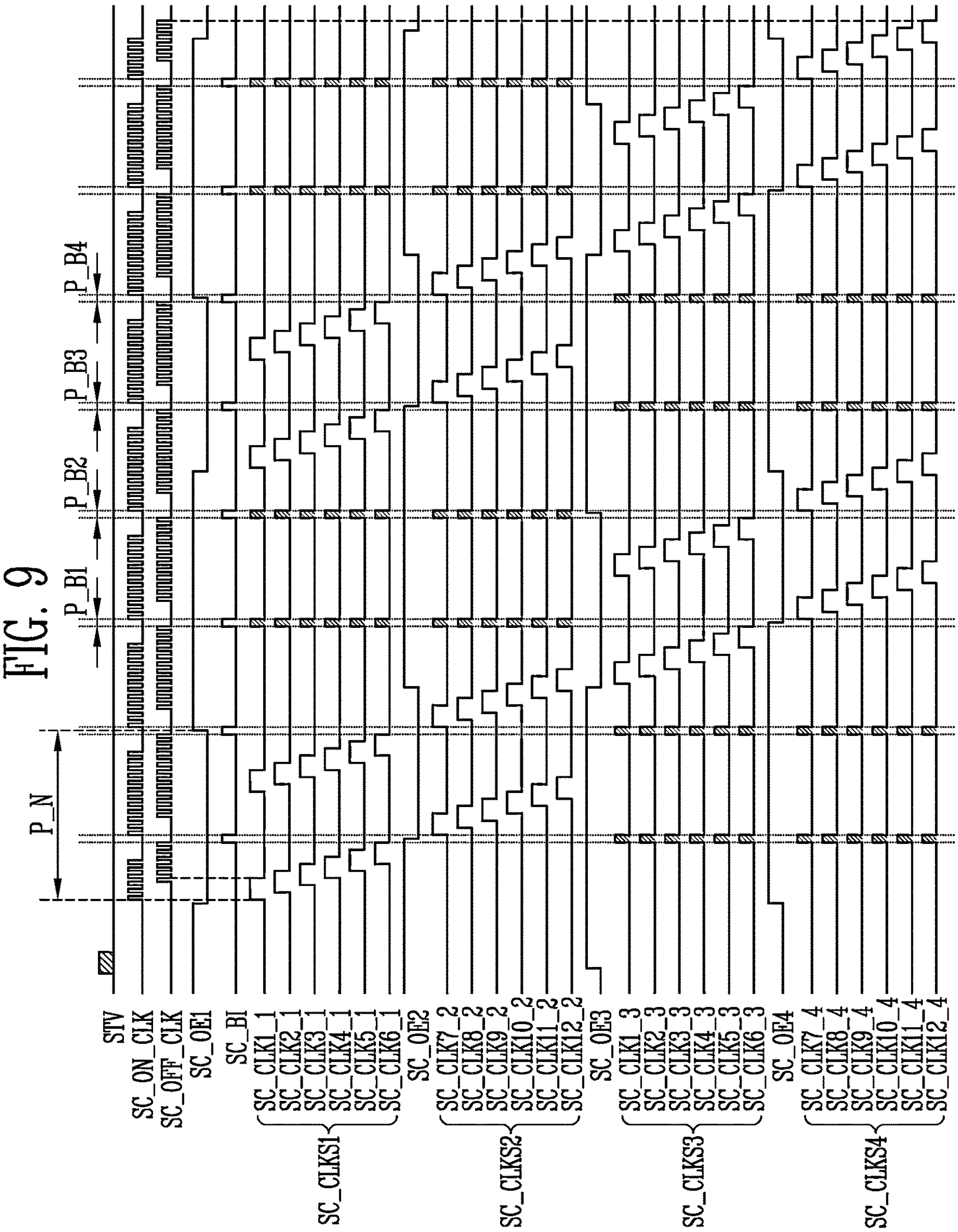
FIG. 9 is a waveform diagram illustrating an example of signals measured in the clock generator shown in FIG. 7, according to one or more embodiments of the present disclosure.
Figure 10:
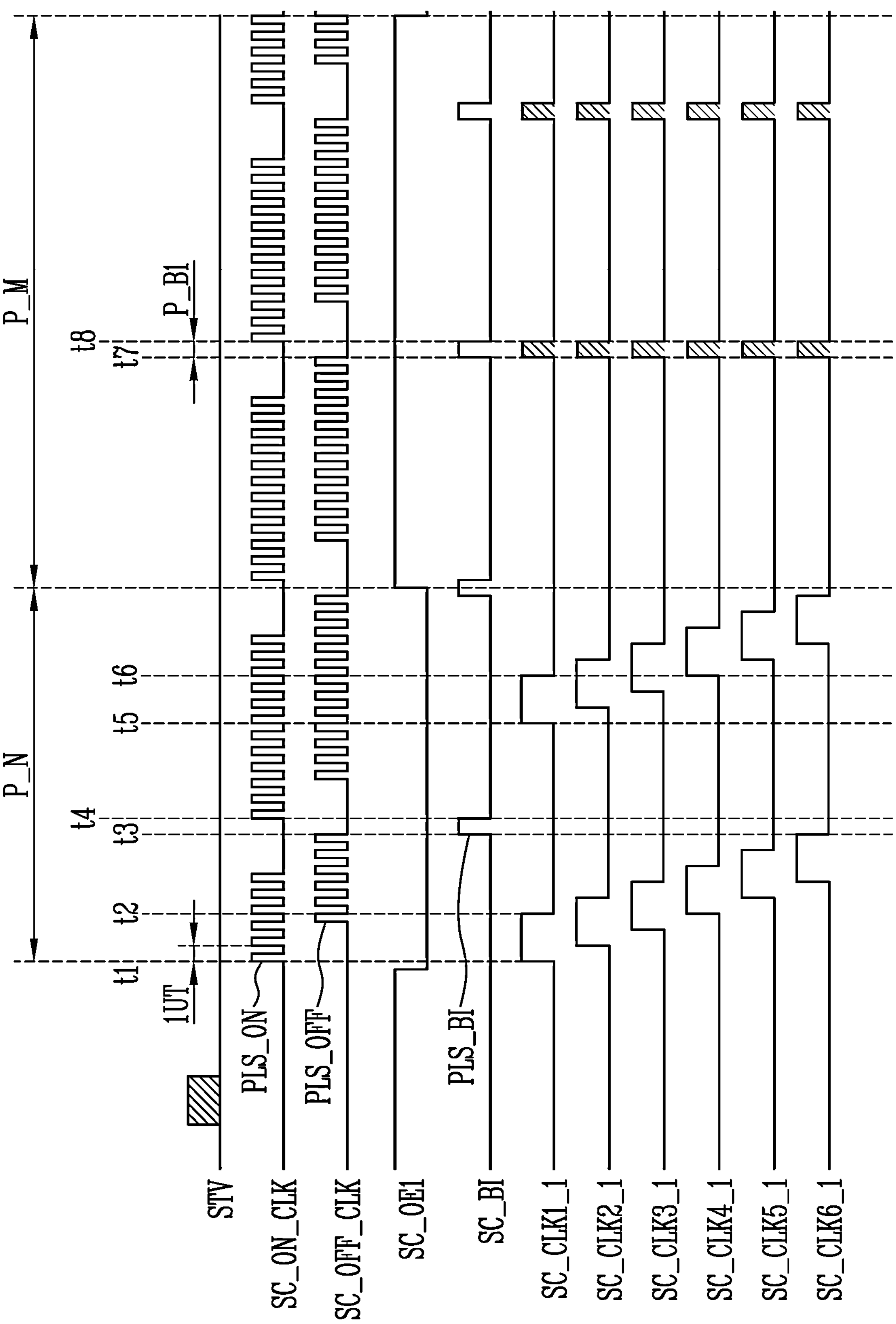
FIG. 10 is an enlarged waveform diagram of FIG. 9, according to one or more embodiments of the present disclosure.

FIG. 9 is a waveform diagram illustrating an example of signals measured in the clock generator shown in FIG. 7, according to one or more embodiments of the present disclosure. Scan clock signals SC_CLKS1, SC_CLKS2, SC_CLKS3, and SC_CLKS4 in the clock generator 160 (see FIG. 7) are mainly illustrated in FIG. 9. FIG. 10 is an enlarged waveform diagram of FIG. 9, according to one or more embodiments of the present disclosure. First scan clock signals SC_CLKS1 shown in FIG. 9 are illustrated in FIG. 10.

Referring to FIG. 9, a start signal STV, a scan on-clock signal SC_ON_CLK, a scan off-clock signal SC_OFF_CLK, scan enable signals SC_OE1, SC_OE2, SC_OE3, and SC_OE4, a scan common signal SC_BI, and scan clock signals SC_CLKS1, SC_CLKS2, SC_CLKS3, and SC_CLKS4 are illustrated. The start signal STV may define start of an operation of the clock generator 160 (see FIG. 7). The scan clock signals SC_CLKS1, SC_CLKS2, SC_CLKS3, and SC_CLKS4 may have different phases (e.g., 24 different phases). However, the scan clock signals SC_CLKS1, SC_CLKS2, SC_CLKS3, and SC_CLKS4 are not limited thereto.

After a pulse of the start signal STV is generated, a pulse may appear in the scan on-clock signal SC_ON_CLK, the scan off-clock signal SC_OFF_CLK, the scan enable signals SC_OE1, SC_OE2, SC_OE3, and SC_OE4, the scan common signal SC_BI, and the scan clock signals SC_CLKS1, SC_CLKS2, SC_CLKS3, and SC_CLKS4.

The scan common signal SC_BI may include first pulses PLS_BI having a logic high level (e.g., second voltage level, or turn-on voltage level). The first pulses PLS_BI may be repeated at a first time interval. Periods in which the respective first pulses PLS_BI are generated may be defined as black periods (e.g., black periods P_B1, P_B2, P_B3, P_B4, . . . ).

The scan on-clock signal SC_ON_CLK may include a plurality of second pulses PLS_ON having a logic high level in a period in which the scan common signal SC_BI has a logic low level (e.g., first voltage level, or turn-off voltage level).

For example, referring to FIG. 10, the scan on-clock signal SC_ON_CLK may include 12 second pulses PLS_ON when appear consecutively in a period after a fourth time t4. A number of the second pulses PLS_ON, i.e., 12 is set in relation to 24 phases (e.g., 24 different phases of the scan clock signals SC_CLKS1, SC_CLKS2, SC_CLKS3, and SC_CLKS4). However, the number of the second pulses PLS_ON is not limited to 12. The second pulses PLS_ON may be repeated at a second time interval (e.g., one unit time 1 UT).

Similar to the scan on-clock signal SC_ON_CLK, the scan off-clock signal SC_OFF_CLK may include a plurality of third pulses PLS_OFF having a logic high level in a period in which the scan common signal SC_BI has a logic low level. In a normal period P_N, the scan off-clock signal SC_OFF_CLK may have a waveform substantially identical to that of the scan on-clock signal SC_ON_CLK, and have a phase delayed by p−0.5 times (e.g., p is a positive integer) of the second time interval from the scan on-clock signal SC_ON_CLK. For example, as shown in FIG. 10, the scan off-clock signal SC_OFF_CLK may have a phase delayed by 2.5 unit times 2.5 UT from the scan on-clock signal SC_ON_CLK.

At a first time t1 or just before the first time t1, the first scan enable signal SC_OE1 may be changed from a logic high level to a logic low level. A period in which the first scan enable signal SC_OE1 has the logic low level may be defined as the normal period P_N.

Also, at the first time t1, the second pulses PLS_ON of the scan on-clock signal SC_ON_CLK may start appearing.

At the first time t1, a first scan clock signal SC_CLK1_1 may be changed from a logic low level (or turn-off voltage level) to a logic high level (or turn-on voltage level) in response to a rising edge of a first pulse of the scan on-clock signal SC_ON_CLK. A time at which a rising edge of a first pulse of the first scan clock signal SC_CLK1_1 occurs may accord with that at which the rising edge of the first pulse of the scan on-clock signal SC_ON_CLK occurs.

Subsequently, just before a second time t2, the third pulses PLS_OFF of the scan off-clock signal SC_OFF_CLK may start appearing.

At the second time t2, the first scan clock signal SC_CLK1_1 may be changed from the logic high level to the logic low level in response to a falling edge of a first pulse of the scan off-clock signal SC_OFF_CLK. A time at which a falling edge of a first pulse of the first scan clock signal SC_CLK1_1 occurs may accord with that at which the falling edge of the first pulse of the scan off-clock signal SC_OFF_CLK occurs.

For example, the clock generator 160 (see FIG. 7) may generate the first pulse of the first scan clock signal SC_CLK1_1, based on the rising edge of the first pulse of the scan on-clock signal SC_ON_CLK and the falling edge of the first pulse of the scan off-clock signal SC_OFF_CLK. In other words, the clock generator 160 may generate first scan clock signals SC_CLK1_1, based on triggering of signals having polarities opposite to each other.

Similar to the first scan clock signal SC_CLK1_1, a first pulse of a second scan clock signal SC_CLK2_1 may correspond to a rising edge of a second pulse of the scan on-clock signal SC_ON_CLK and a falling edge of a second pulse of the scan off-clock signal SC_OFF_CLK. The first pulse of the second scan clock signal SC_CLK2_1 may appear to be delayed by one unit time 1 UT from the first pulse of the first scan clock signal SC_CLK1_1.

Similarly, pulses of a third scan clock signal SC_CLK3_1, a fourth scan clock signal SC_CLK4_1, a fifth scan clock signal SC_CLK5_1, and a sixth scan clock signal SC_CLK6_1 may be sequentially generated.

The scan common signal SC_BI may have a pulse (e.g., PLS_BI) of a logic high level between a third time t3 and the fourth time t4. The width of a pulse of the scan common signal SC_BI may be 1.5 unit times 1.5 UT, but the present disclosure is not limited thereto.

The third scan clock signals SC_CLKS3 and the fourth scan clock signals SC_CLKS4, which are shown in FIG. 9, may have pulses of a logic high level, which corresponds to the pulse of the scan common signal SC_BI.

Referring back to FIG. 10, in a period between a fifth time t5 and a sixth time t6, the scan on-clock signal SC_ON_CLK may have the second pulse of the logic high level. The fifth time t5 may be a time at which a specific time (e.g., 13 unit times 13 UT) elapses from the first time t1. Subsequently, the pulses of the second scan clock signal SC_CLK2_1, the third scan clock signal SC_CLK3_1, the fourth scan clock signal SC_CLK4_1, the fifth scan clock signal SC_CLK5_1, and the sixth scan clock signal SC_CLK6_1 may be sequentially generated.

For example, in the normal period P_N, each of the scan clock signals SC_CLK1_1 to SC_CLK6_1 may include pulses having a specific period, and have different phases.

In a masking period P_M after the sixth time t6, the first scan enable signal SC_OE1 may have a logic high level. For example, a period in which the first scan enable signal SC_OE1 has the logic high level may be defined as the masking period P_M.

In the masking period P_M, the scan on-clock signal SC_ON_CLK may have second pulses PLS_ON of the logic high level, and the scan off-clock signal SC_OFF_CLK may have third pulses PLS_OFF of the logic high level. However, the first scan clock signal SC_CLK1_1 may not include a pulse corresponding to the second pulses PLS_ON of the scan on-clock signal SC_ON_CLK and the third pulses PLS_OFF of the scan off-clock signal SC_OFF_CLK. Similarly, in the masking period P_M, each of the second to sixth scan clock signals SC_CLK2_1 to SC_CLK6_1 may not include a pulse corresponding to the scan on-clock signal SC_ON_CLK and the scan off-clock signal SC_OFF_CLK.

Meanwhile, the scan common signal SC_BI may have a pulse of the logic high level between a seventh time t7 and an eighth time t8.

The first scan clock signal SC_CLK1_1 may have a pulse of the logic high level, which corresponds to that of the scan common signal SC_BI between the seventh time t7 and the eighth time t8. Similarly, each of the second to sixth scan clock signals SC_CLK2_1 to SC_CLK6_1 may have a pulse of the logic high level, which corresponds to that of the scan common signal SC_BI between the seventh time t7 and the eighth time t8.

For example, in the masking period P_M, the first to sixth scan clock signals SC_CLK1_1 to SC_CLK6_1 may have a pulse (or common pulse) at the same time (e.g., between the seventh time t7 and the eighth time t8), corresponding to the pulse (i.e. the pulse of the logic high level) of the scan common signal SC_BI. The common pulse of the first to sixth scan clock signals SC_CLK1_1 to SC_CLK6_1 may be used to generate a scan signal (e.g., a pulse in the second sub-period PS2 described with reference to FIG. 4A) for black frame insertion.

Referring back to FIG. 9, similar to the first to sixth scan clock signals SC_CLK1_1 to SC_CLK6_1, seventh to twelfth scan clock signals SC_CLK7_2 to SC_CLK12_2 may include pulses having different phases in a period in which the second scan enable signal SC_OE2 has a logic low level, and include a pulse at the same time (e.g., a first black period P_B1 and a second black period P_B2), corresponding to the pulse (i.e., the pulse of the logic high level) in the period in which the second scan enable signal SC_OE2 has the logic high level.

First to sixth scan clock signals SC_CLK1_3 to SC_CLK6_3 included in the third clock signals SC_CLKS3 may include pulses having different phases in a period in which the third scan enable signal SC_OE3 has a logic low level, and include a pulse at the same time (e.g., a third black period P_B3 and a fourth black period P_B4), corresponding to the pulse of the scan common signal SC_BI in the period in which the third scan enable signal SC_OE3 has the logic high level.

Seventh to twelfth scan clock signals SC_CLK7_4 to SC_CLK12_4 included in the fourth clock signals SC_CLKS4 may include pulses having different phases in a period in which the fourth scan enable signal SC_OE4 has a logic low level, and include a pulse at the same time (e.g., the third black period P_B3 and the fourth black period P_B4), corresponding to the pulse of the scan common signal SC_BI in the period in which the fourth scan enable signal SC_OE4 has the logic high level.

Therefore, the clock signals SC_CLK1_1 to SC_CLK6_1, SC_CLK7_2 to SC_CLK12_2, SC_CLK1_3 to SC_CLK6_3, and SC_CLK7_4 to SC_CLK12_4 having 24 different phases may be generated.

As described with reference to FIGS. 9 and 10, pulses of scan clock signals output from the corresponding level shifter may have different phases in a period (i.e., the normal period P_N) in which a scan enable signal (e.g., the first scan enable signal SC_OE1) applied to the corresponding level shifter has a logic low level, and have the same phase, corresponding to the scan common signal SC_BI in a period (i.e., the masking period P_M) in which the scan enable signal applied to the corresponding level shifter has a logic high level.

Meanwhile, the clock generator 160 (see FIG. 7) may generate sensing clock signals, similarly to the scan clock signals described with reference to FIGS. 9 and 10.

Figure 11:
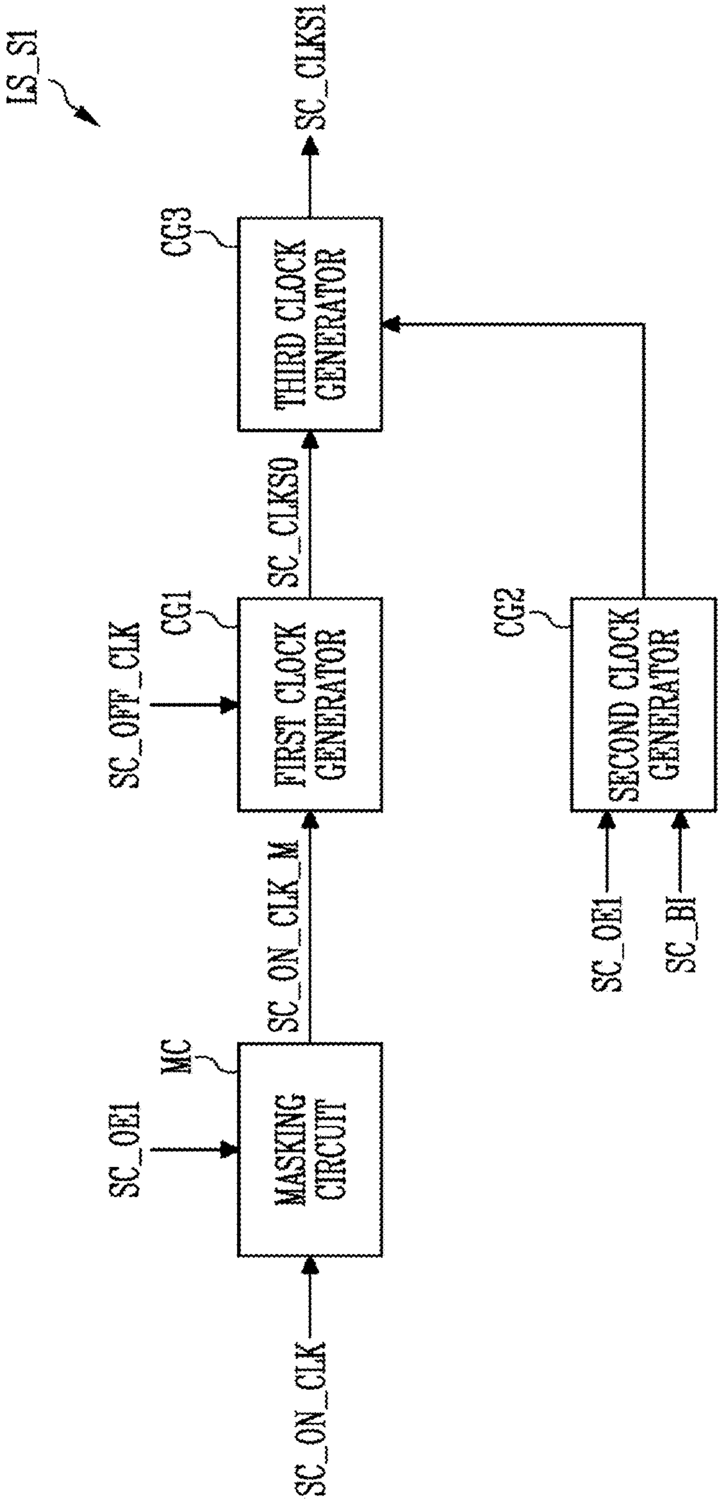
FIG. 11 is a diagram illustrating an example of a first sub-level shifter included in the first level shifter shown in FIG. 8, according to one or more embodiments of the present disclosure.
Figure 12A:
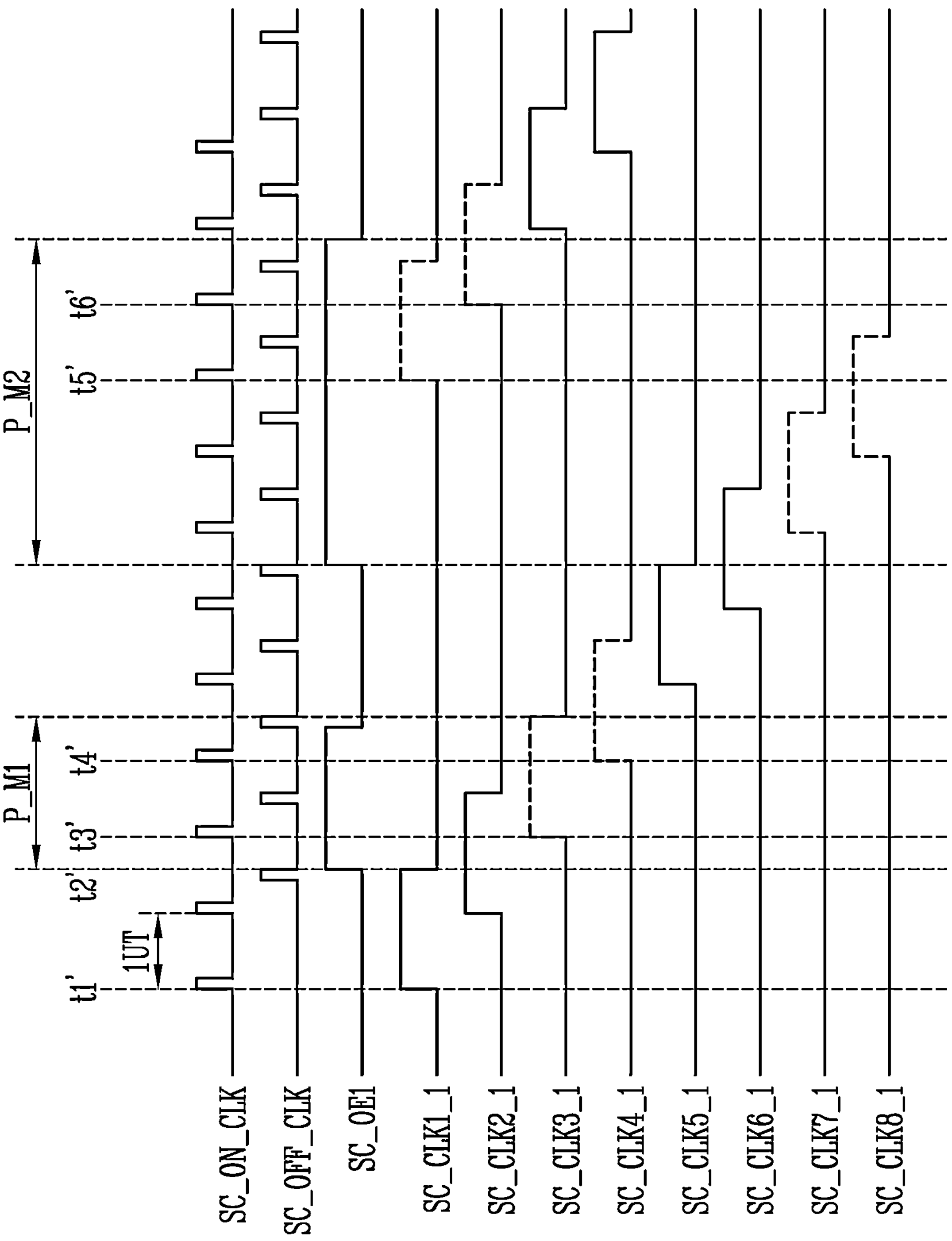
FIGS. 12A and 12B are waveform diagrams illustrating an operation of the first sub-level shifter shown in FIG. 11, according to one or more embodiments of the present disclosure.
Figure 12B:
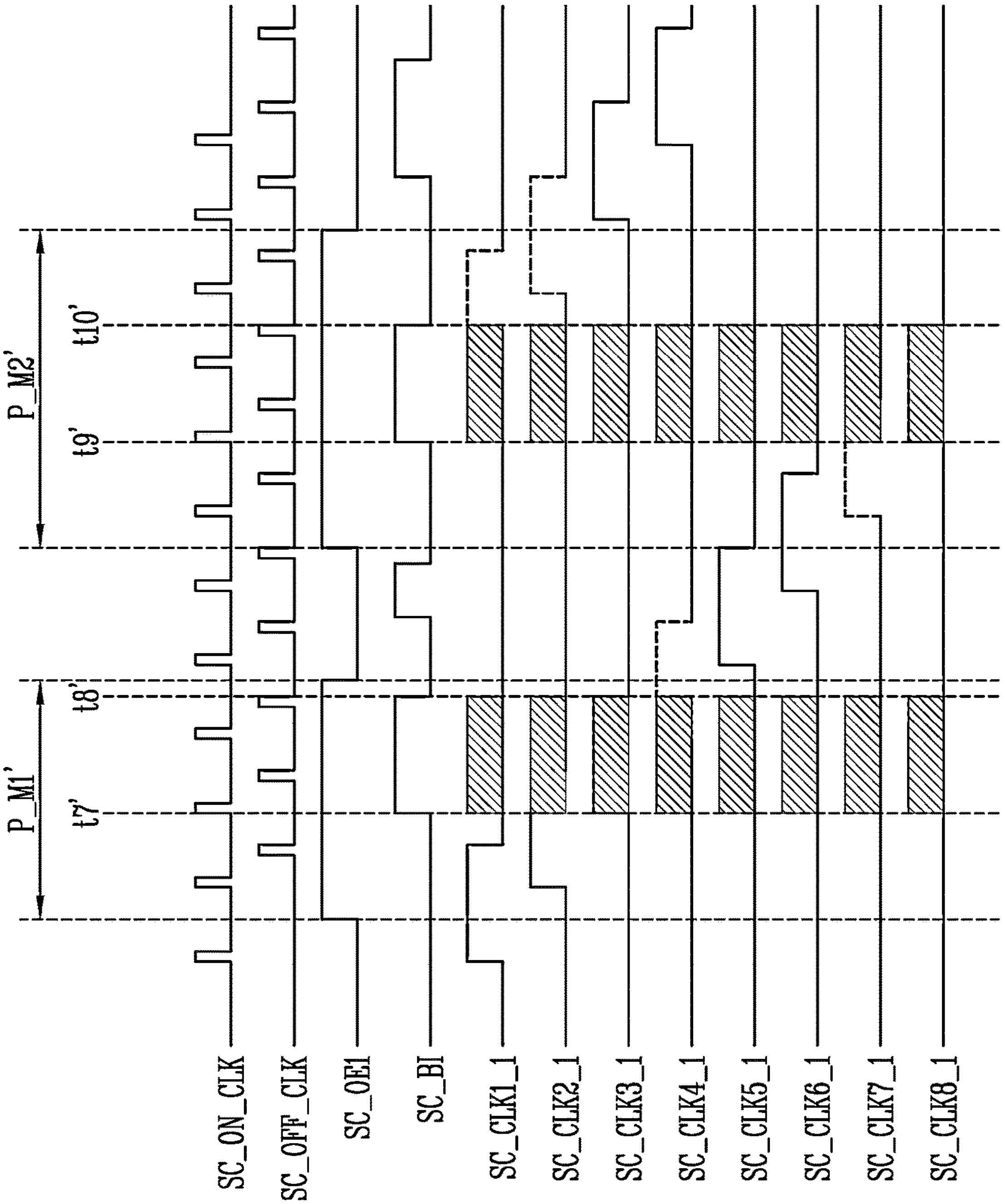

FIG. 11 is a diagram illustrating an example of the first sub-level shifter included in the first level shifter shown in FIG. 8, according to one or more embodiments of the present disclosure. FIGS. 12A and 12B are waveform diagrams illustrating an operation of the first sub-level shifter shown in FIG. 11, according to one or more embodiments of the present disclosure.

Referring to FIGS. 8 and 11, the first sub-level shifter LS_S1 and the second sub-level shifter LS_S2 are substantially identical or similar to each other, and therefore, the first sub-level shifter LS_S1 will be described, with the understanding that the description of the first sub-level shifter LS_S1 may also apply to the description of the second sub-level shifter LS_S2. In one or more embodiments, a configuration of generating scan clock signals and a configuration of generating sensing clock signals are substantially identical to each other, and therefore, the configuration of generating scan clock signals will be described which may include the configuration of generating scan clock signals and the configuration of generating sensing clock signals.

The first sub-level shifter LS_S1 may include a masking circuit MC, a first clock generation circuit CG1 (or first clock generator), a second clock generation circuit CG2 (or second clock generator), and a third clock generation circuit CG3 (or third clock generator).

The masking circuit MC may generate a modulated scan on-clock signal SC_ON_CLK_M by masking at least some of the pulses of a scan on-clock signal SC_ON_CLK, based on a first scan enable signal SC_OE1 having a logic high level (or second voltage level).

The first clock generation circuit CG1 may generate scan reference clock signals SC_CLKS0, based on the modulated scan on-clock signal SC_ON_CLK_M and a scan off-clock signal SC_OFF_CLK.

Operations of the masking circuit MC and the first clock generation circuit CG1 will be described with reference to FIG. 12A.

Referring to FIG. 12A, the scan on-clock signal SC_ON_CLK, the scan off-clock signal SC_OFF_CLK, and the first scan enable signal SC_OE1 are respectively substantially identical or similar to the scan on-clock signal SC_ON_CLK, the scan off-clock signal SC_OFF_CLK, and the first scan enable signal SC_OE1, which are described with reference to FIGS. 9 and 10, and therefore, overlapping descriptions will not be repeated.

In a period between a first time t1' and a second time t2', the first scan enable signal SC_OE1 may have a logic low level, and accordingly, any pulse of the scan on-clock signal SC_ON_CLK may not be masked in the period between the first time t1' and the second time t2'.

Therefore, a first scan clock signal SC_CLK1_1 and a second scan clock signal SC_CLK2_1 may appear corresponding to a first pulse and a second pulse of the scan on-clock signal SC_ON_CLK. For example, the first clock generation circuit CG1 may generate a pulse of the first scan clock signal SC_CLK1_1 and a pulse of the second scan clock signal SC_CLK2_1, based on the first pulse and the second pulse of the scan on-clock signal SC_ON_CLK.

In a first masking period P_M1, the first scan enable signal SC_OE1 may have a logic high level. Accordingly, the masking circuit MC may mask a third pulse and a fourth pulse of the scan on-clock signal SC_ON_CLK, and a third scan clock signal SC_CLK3_1 and a fourth scan clock signal SC_CLK4_1 may not have any pulse. For example, the third scan clock signal SC_CLK3_1 and the fourth scan clock signal SC_CLK4_1 may be maintained at a low level in the first masking period P_M1.

Subsequently, in a period (i.e., a period between the first masking period P_M1 and a second masking period P_M2) in which the first scan enable signal SC_OE1 has a logic low level, a fifth pulse and a sixth pulse of the scan on-clock signal SC_ON_CLK are not masked, and a pulse of a fifth scan clock signal SC_CLK5_1 and a pulse of a sixth scan clock signal SC_CLK6_1 may appear.

Because only the scan on-clock signal SC_ON_CLK is masked, the pulse of the first scan clock signal SC_CLK1_1 and the pulse of the second scan clock signal SC_CLK2_1, which were generated based on the scan on-clock signal SC_ON_CLK before the first masking period P_M1, may have a falling edge in the first masking period P_M1. For example, at least one of the pulse of the first scan clock signal SC_CLK1_1 and the pulse of the second scan clock signal SC_CLK2_1 may overlap with the first scan enable signal SC_OE1 having the logic high level (or the first masking period P_M1).

In the second masking period P_M2, the first scan enable signal SC_OE1 may have the logic high level, and the masking circuit MC may mask a seventh pulse and an eighth pulse of the scan on-clock signal SC_ON_CLK. Accordingly, a seventh scan clock signal SC_CLK7_1 and an eighth scan clock signal SC_CLK8_1 may not have any pulse.

In one or more embodiments, at a fifth time t5' and a sixth time t6', each at which a specific time elapses from the first time t1', pulses of the scan on-clock signal SC_ON_CLK may be masked, and accordingly, the first scan clock signal SC_CLK1_1 and the second scan clock signal SC_CLK2_1 may not have any pulse.

Referring back to FIG. 11, the second clock generation circuit CG2 may generate a scan common pulse, based on the first scan enable signal SC_OE1 having the logic high level (or second voltage level) and a scan common signal SC_BI.

The third clock generation circuit CG3 may generate first scan clock signals SC_CLKS1 by inserting a scan common pulse into the scan reference clock signals SC_CLKS0.

Operations of the second clock generation circuit CG2 and the third clock generation circuit CG3 will be described with reference to FIG. 12B.

Referring to FIG. 12B, the scan common signal SC_BI may have a logic high level in a period between a seventh time t7' and an eighth time t8' in a first masking period P_M1'. Accordingly, first to eighth scan clock signals SC_CLK1_1 to SC_CLK8_1 may concurrently (e.g., simultaneously) have a logic high level or have the same pulse in the period between the seventh time t7' and the eighth time t8'. For example, the second clock generation circuit CG2 may provide the third clock generation circuit CG3 with a first pulse of the scan common signal SC_BI, and the third clock generation circuit CG3 may insert (or couple) the first pulse of the scan common signal SC_BI into (or to) the first to eighth scan clock signals SC_CLK1_1 to SC_CLK8_1 as it is.

In a period between the first masking period P_M1' and a second masking period P_M2', the scan common signal SC_BI may have a pulse of a logic high level. However, because during the same period the first scan enable signal SC_OE1 has the logic low level, the first to eighth scan clock signals SC_CLK1_1 to SC_CLK8_1 may not include any common pulse. For example, the second clock generation circuit CG2 may mask a pulse of the scan common signal SC_BI in the period between the first masking period P_M1' and the second masking period P_M2'.

Subsequently, the scan common signal SC_BI may have the logic high level in a period between a ninth time t9' and a tenth time t10' in the second masking period P_M2'. Accordingly, the first to eighth scan clock signals SC_CLK1_1 to SC_CLK8_1 may concurrently (e.g., simultaneously) have a logic high level or have the same pulse in the period between the ninth time t9' and the tenth time t10'.

As described with reference to FIGS. 11, 12A, and 12B, the first sub-level shifter LS_S1 (e.g., the first level shifter LS1 (see FIG. 8), or the clock generator 160 (see FIG. 7)) may mask at least a portion of an on-clock signal (or a pulse of the on-clock signal), based on an enable signal having a logic high level, and generate clock signals, based on the masked on-clock signal and an off-clock signal. Also, the first sub-level shifter LS_S1 may insert a pulse of a common signal into the clock signals as it is, while the enable signal has the logic high level. For example, the clock generator 160 (see FIG. 7) may generate clock signals having different phases, to which a black frame insertion technology is applied, by using the on-clock signal, the off-clock signal, and the common signal (i.e., decreased input signals).

Figure 13:
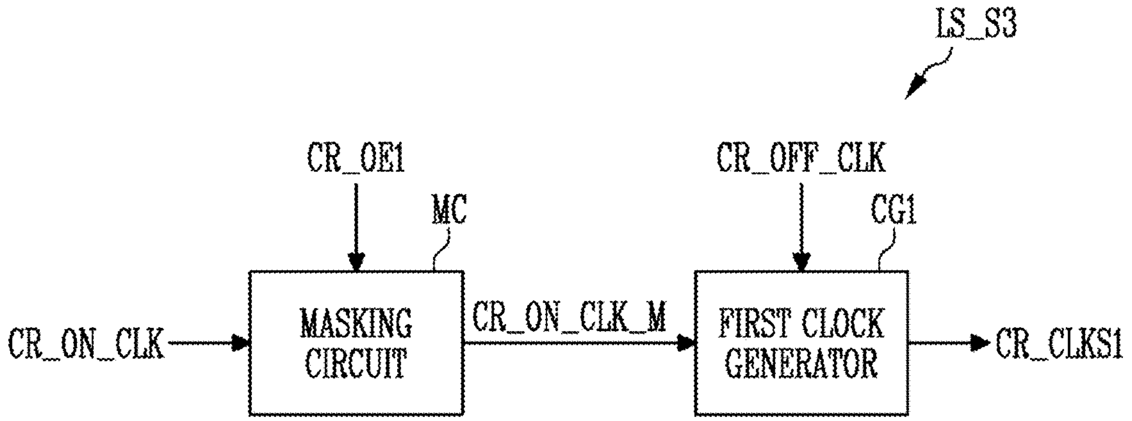
FIG. 13 is a diagram illustrating an example of a third sub-level shifter included in the first level shifter shown in FIG. 8, according to one or more embodiments of the present disclosure.

FIG. 13 is a diagram illustrating an example of the third sub-level shifter included in the first level shifter shown in FIG. 8, according to one or more embodiments of the present disclosure.

Referring to FIGS. 8, 11, and 13, the third sub-level shifter LS_S3 may include a masking circuit MC and a first clock generation circuit CG1 (or first clock generator). The masking circuit MC and the first clock generation circuit CG1 in FIG. 13 are substantially identical or similar to the masking circuit MC and the first clock generation circuit CG1, which are described with reference to FIG. 11, and therefore, overlapping descriptions will not be repeated.

The masking circuit MC may generate a modulated carry on-clock signal CR_ON_CLK_M by masking at least some pulses of carry on-clock signals CR_ON_CLK, based on a first carry enable signal CR_OE1 having a logic high level (or second voltage level).

The first clock generation circuit CG1 may generate first carry clock signals CR_CLKS1, based on the modulated carry on-clock signal CR_ON_CLK_M and a carry off-clock signal CR_OFF_CLK.

For example, because the third sub-level shifter LS_S3 does not receive any separate common signal, the third sub-level shifter LS_S3 may output an output signal of the first clock generation circuit CG1 as the first carry clock signals CR_CLKS1.

Although a case where the third sub-level shifter LS_S3, described with respect to FIG. 13, has a configuration different from that of the first sub-level shifter LS_S1 shown in FIG. 11, the present disclosure is not limited thereto. For example, the third sub-level shifter LS_S3 may further include the second clock generation circuit CG2 and the third clock generation circuit CG3, which are described with reference to FIG. 11, and the second clock generation circuit CG2 may not receive any separate input signal.

Figure 14:
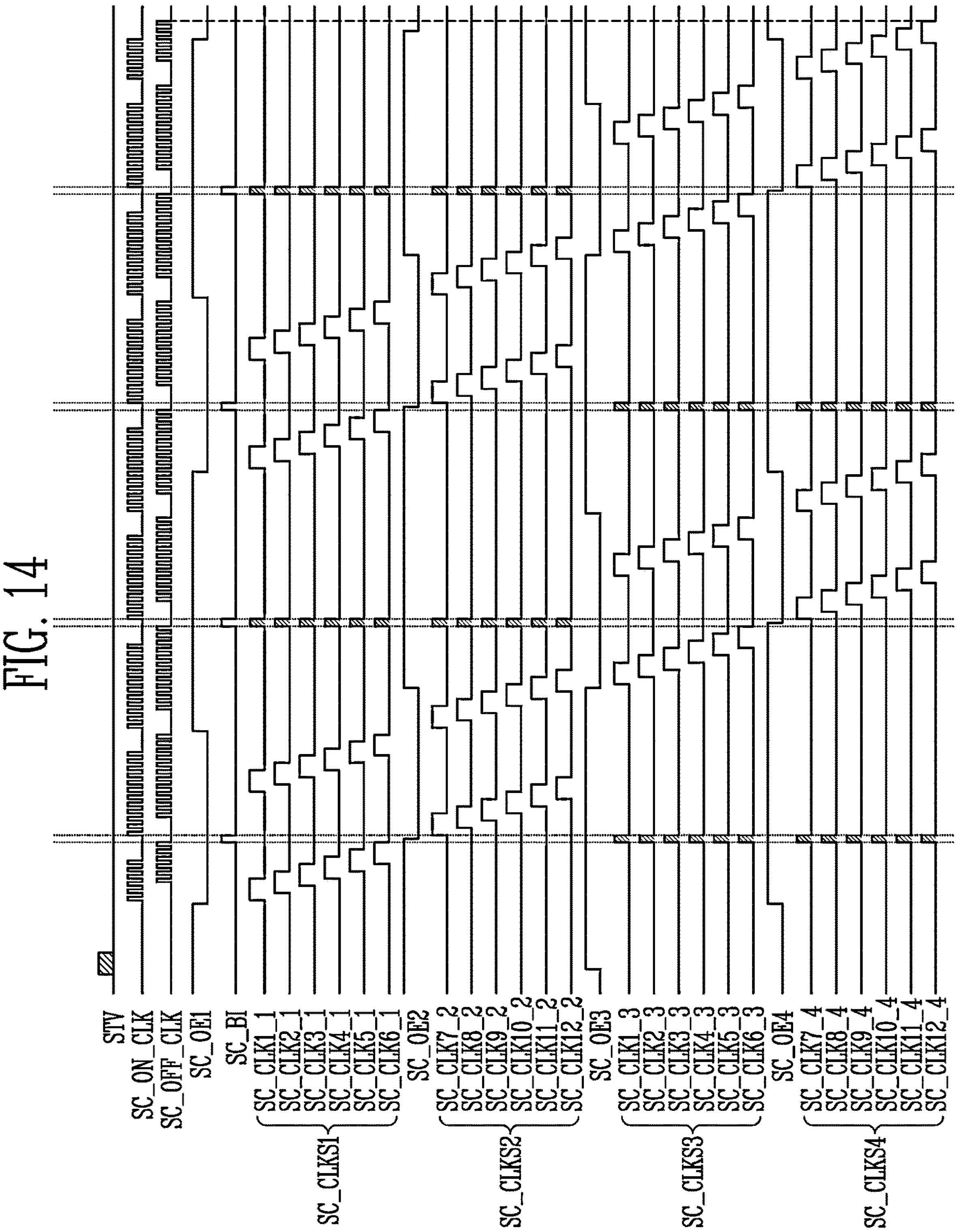
FIG. 14 is a waveform diagram illustrating another example of the signals measured in the clock generator shown in FIG. 7, according to one or more embodiments of the present disclosure.

FIG. 14 is a waveform diagram illustrating another example of the signals measured in the clock generator shown in FIG. 7, according to one or more embodiments of the present disclosure. A waveform diagram corresponding to FIG. 9 is illustrated in FIG. 14.

Referring to FIGS. 9 and 14, except a scan common signal SC_BI, scan clock signals SC_CLKS1, SC_CLKS2, SC_CLKS3, and SC_CLKS4 may be respectively substantially identical or similar to the scan clock signals SC_CLKS1, SC_CLKS2, SC_CLKS3, and SC_CLKS4 described with reference to FIG. 9. Therefore, overlapping descriptions will not be repeated.

The scan common signal SC_BI shown in FIG. 9 may have two pulses in a period in which at least one of the scan enable signals SC_OE1, SC_OE2, SC_OE3, and SC_OE4 has a logic high level, and the scan common signal SC_BI shown in FIG. 14 may have only one pulse in a period in which at least one of scan enable signals SC_OE1, SC_OE2, SC_OE3, and SC_OE4 has a logic high level.

Accordingly, each of the scan clock signals SC_CLKS1, SC_CLKS2, SC_CLKS3, and SC_CLKS4 may have only one common pulse in the period in which at least one of the scan enable signals SC_OE1, SC_OE2, SC_OE3, and SC_OE4 has the logic high level.

Figure 15:
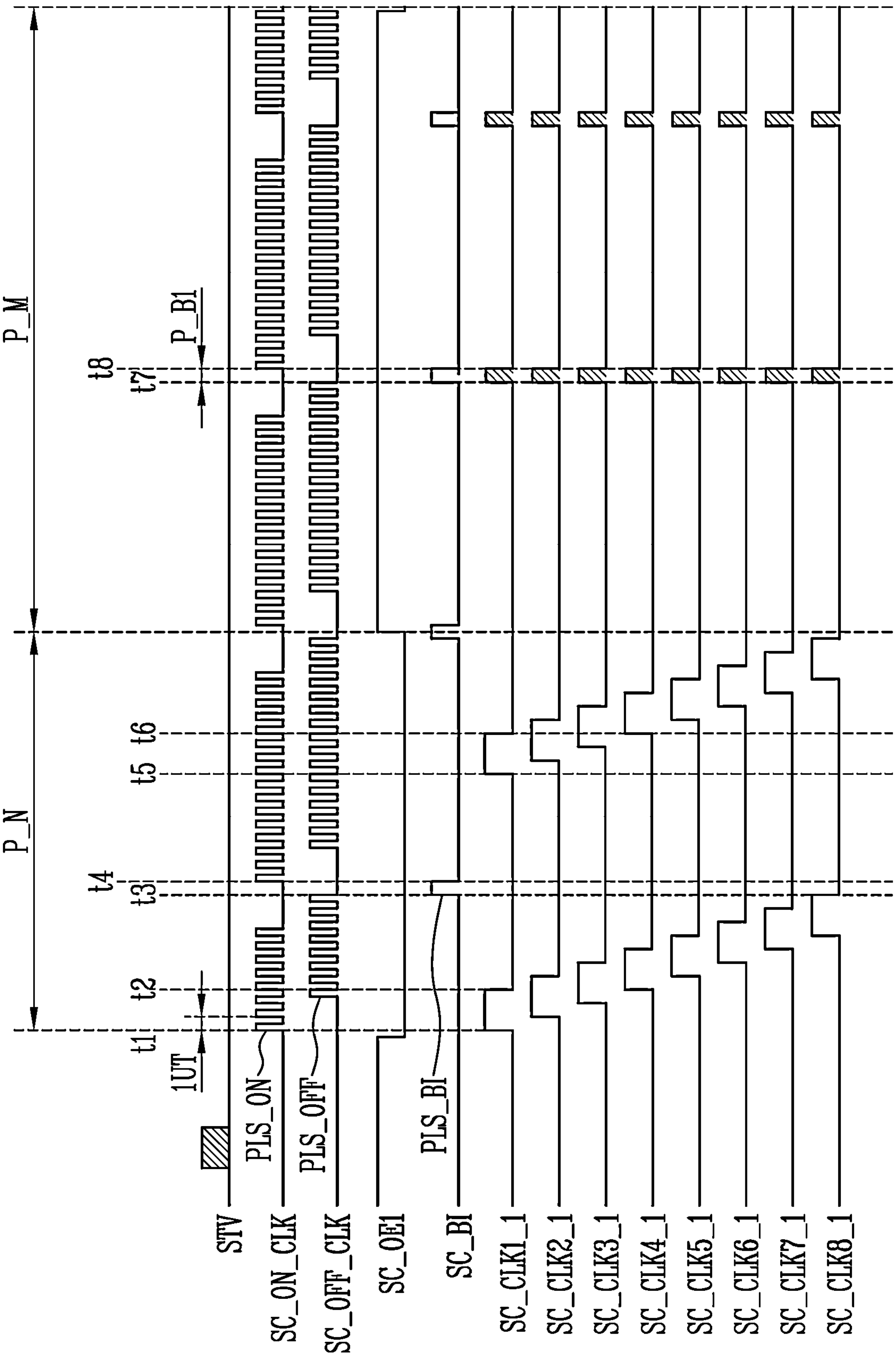
FIGS. 15 and 16 are waveform diagrams illustrating still another example of the signals measured in the clock generator shown in FIG. 7, according to one or more embodiments of the present disclosure.
Figure 16:
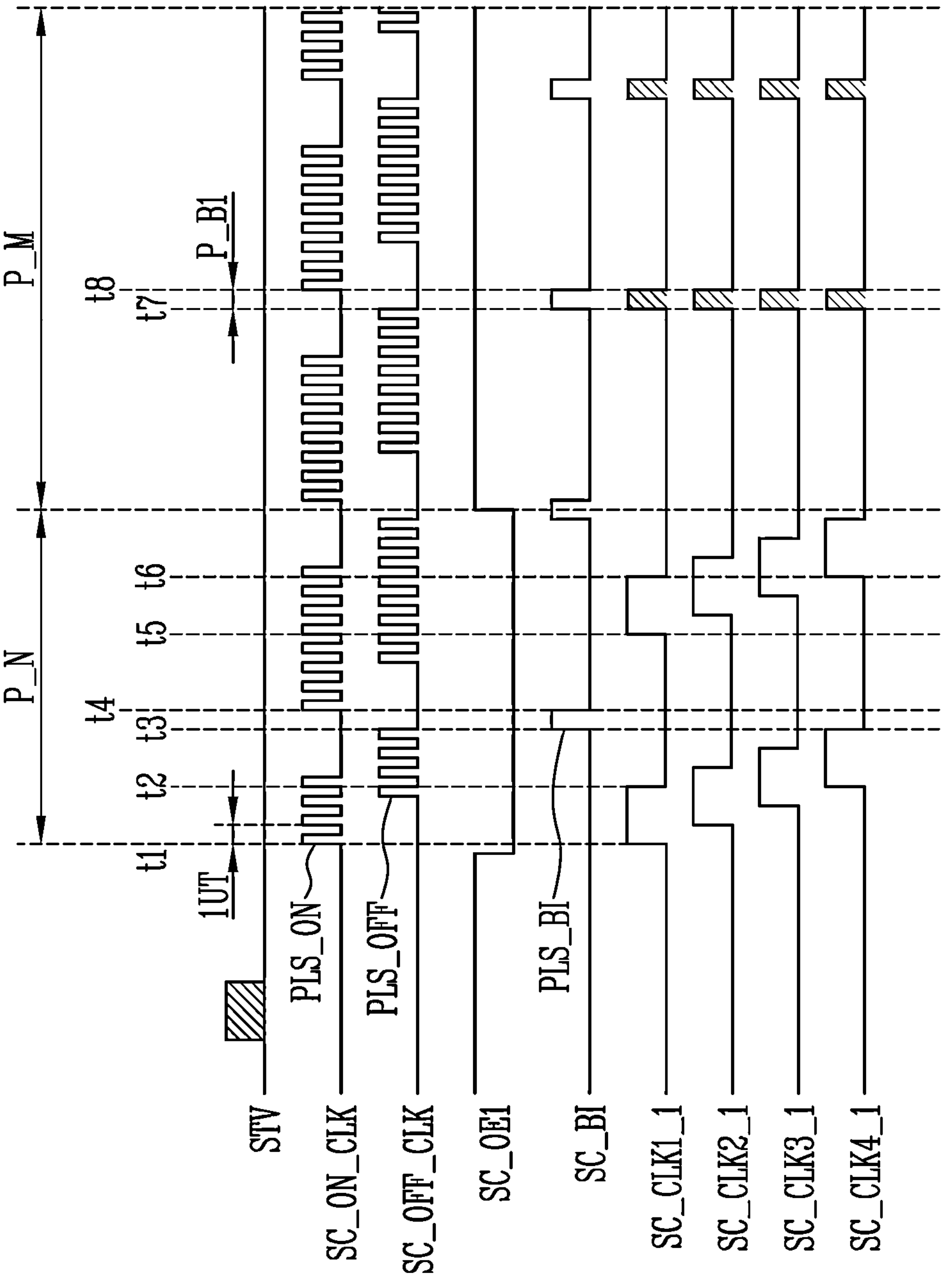

FIGS. 15 and 16 are waveform diagrams illustrating still another example of the signals measured in the clock generator shown in FIG. 7, according to one or more embodiments of the present disclosure. A waveform corresponding to FIG. 10 is illustrated in FIGS. 15 and 16.

Referring to FIGS. 10, 15, and 16, except a number of second pulses PLS_ON of a scan on-clock signal SC_ON_CLK and a number of third pulses PLS_OFF of a scan off-clock signal SC_OFF_CLK according to a period of first pulses PLS_BI of a scan common signal SC_BI, clock signals SC_CLK1_1 to SC_CLK8_1 shown in FIG. 15 (or scan clock signals SC_CLK1_1 to SC_CLK4_1 shown in FIG. 16) may be substantially identical or similar to the clock signals SC_CLK1_1 to SC_CLK6_1 described with reference to FIG. 10. Therefore, overlapping descriptions will not be repeated.

As shown in FIG. 15, in a period between the first pulses PLS_BI of the scan common signal SC_BI, the scan on-clock signal SC_ON_CLK may include 16 second pulses PLS_ON, and the scan off-clock signal SC_OFF_CLK may include 16 third pulses PLS_OFF.

Accordingly, eight scan clock signals SC_CLK1_1 to SC_CLK8_1 having different phases (i.e., first to eighth scan clock signals SC_CLK1_1 to SC_CLK8_1 each having two pulses in a normal period P_N) may be generated. The clock generator 160 (see FIG. 7) may generate 32 scan clock signals having different phases.

As shown in FIG. 16, in a period between the first pulses PLS_BI of the scan common signal SC_BI, the scan on-clock signal SC_ON_CLK may include 8 second pulses PLS_ON, and the scan off-clock signal SC_OFF_CLK may include 8 third pulses PLS_OFF.

Accordingly, four clock signals SC_CLK1_1 to SC_CLK4_1 having different phases (i.e., first to fourth scan clock signals SC_CLK1_1 to SC_CLK4_1 each having two pulses in the normal period P_N) may be generated. The clock generator 160 (see FIG. 7) may generate 16 scan clock signals having different phases.

As described with reference to FIGS. 15 and 16, the number of scan clock signals (similarly, sensing clock signals) may be variously changed.

The clock generator and the display device according to the present disclosure include a plurality of level shifters for generating clock signals. The level shifters commonly receive an on-clock signal, an off-clock signal, and a common signal from among input signals through a common line, and individually receive only an enable signal among the input signals through an individual line. Thus, a number of input terminals of the clock generator including the level shifters, a number of output terminals of the timing controller, which corresponds to the number of input terminals, a number of lines correcting the input terminals and the output terminals, and the like may decrease.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An electronic device comprising:

a processor configured to generate a control signal and input image data; and a display device configured to display an image based on the control signal and the input image data, wherein the display device comprises:

a display unit comprising gate lines and pixels electrically coupled to the gate lines;

a timing controller configured to generate a gate control signal including an on-clock signal, an off-clock signal, an enable signal, and a common signal based on the control signal, and to generate image data based on the input image data;

a clock generator comprising a plurality of level shifters configured to respectively generate a plurality of clock signals having different phases based on the on-clock signal and the off-clock signal, when the enable signal has a first voltage level, and configured to insert a common pulse into each of the plurality of clock signals, based on the common signal, when the enable signal has a second voltage level different from the first voltage level, such that all of the clock signals have a same level at a same time due to the common pulse, the on-clock signal, the off-clock signal, and the common signal being commonly provided to the plurality of level shifters;

a gate driver configured to generate gate signals based on the plurality of clock signals, and to sequentially provide the gate signals to the gate lines; and a data driver configured to generate data signals based on the image data, and to supply the data signals to the pixels.

2. The electronic device of claim 1, wherein the common signal comprises first pulses having a turn-on voltage level, wherein the first pulses are repeated at a first time interval, wherein the on-clock signal comprises second pulses having the turn-on voltage level in a period in which the common signal has a turn-off voltage level, and wherein the second pulses are repeated at a second time interval that is shorter than the first time interval in the period in which the common signal has the turn-off voltage level.

3. The electronic device of claim 2, wherein the off-clock signal comprises third pulses having the turn-on voltage level in the period in which the common signal has the turn-off voltage level, and wherein the off-clock signal has a phase delayed by p−0.5 times of the second time interval from the on-clock signal, where p is a positive integer.

4. The electronic device of claim 3, wherein the clock generator is configured to generate the plurality of clock signals based on triggering of the on-clock signal and the off-clock signal having opposite polarities, wherein the clock generator is configured to generate the plurality of clock signals based on rising edges of the second pulses of the on-clock signal and falling edges of the third pulses of the off-clock signal, wherein rising edges of the plurality of clock signals appear at the same time as those of the second pulses, and wherein falling edges of the plurality of clock signals appear at the same time as those of the third pulses.

5. The electronic device of claim 4, wherein the common signal comprises at least one of the first pulses, when the enable signal has the second voltage level.

6. The electronic device of claim 1, wherein the clock generator comprises:

a masking circuit configured to generate a modulated on-clock signal by masking at least some pulses of the on-clock signal based on the enable signal having the second voltage level;

a first clock generation circuit configured to generate reference clock signals based on the modulated on-clock signal and the off-clock signal;

a second clock generation circuit configured to generate the common pulse based on the enable signal having the second voltage level and the common signal; and a third clock generation circuit configured to generate the plurality of clock signals by inserting the common pulse into the reference clock signals.

7. The electronic device of claim 6, wherein at least some of the plurality of clock signals overlap with a period in which the enable signal has the second voltage level.

8. The electronic device of claim 1, wherein the enable signal is individually provided to the plurality of level shifters.

9. The electronic device of claim 8, wherein the enable signal comprises a plurality of sub-enable signals, and wherein the sub-enable signals have a same waveform having different phases.

10. The electronic device of claim 1, wherein the gate driver comprises a plurality of stages configured to respectively generate the gate signals, wherein each stage of the plurality of stages is configured to generate a carry signal based on a previous carry signal of a previous stage and a carry clock signal, and to generate a scan signal based on the previous carry signal and a scan clock signal, wherein the scan signal is included in one or more of the gate signals, wherein the carry clock signal and the scan clock signal are included in the plurality of clock signals, and wherein the clock generator comprises:

a first sub-level shifter configured to generate the scan clock signal based on the on-clock signal, the off-clock signal, the enable signal, and the common signal; and a second sub-level shifter configured to generate the carry clock signal based on the on-clock signal, the off-clock signal, and the enable signal.

11. The electronic device of claim 10, wherein the second sub-level shifter comprises:

a masking circuit configured to generate a modulated on-clock signal by masking at least some pulses of the on-clock signal based on the enable signal having the second voltage level; and a first clock generation circuit configured to generate the carry clock signal based on the modulated on-clock signal and the off-clock signal.

12. The electronic device of claim 1, wherein the gate driver is configured to concurrently generate the gate signals having a turn-on voltage level, based on the common pulse.

13. The electronic device of claim 12, wherein, the data driver is further configured to provide a black data signal corresponding to a black image to at least some of the pixels in a period in which the gate signals concurrently have the turn-on voltage level.

14. An electronic device comprising:

a processor configured to generate a control signal and input image data; and a display device configured to display an image based on the control signal and the input image data, wherein the display device comprises:

a display panel comprising pixels electrically coupled to gate lines;

a timing controller configured to generate a gate control signal including an on-clock signal, an off-clock signal, an enable signal, and a common signal based on the control signal, the common signal for determining a timing at which a black data signal is stored in at least some of the pixels, and to generate image data based on the input image data;

a clock generator configured to generate clock signals having different phases based on the on-clock signal and the off-clock signal in a first period in which the enable signal has a first voltage level, and to generate the clock signals having a same phase based on the common signal in a second period in which the enable signal has a second voltage level different from the first voltage level;

a gate driver configured to generate gate signals based on the clock signals, and to sequentially provide the gate signals to the gate lines; and a data driver configured to generate data signals based on the image data, and to supply the data signals to the pixels, wherein the on-clock signal and the off-clock signal have a same waveform having different phases, wherein the on-clock signal in the first period is substantially the same as the on-clock signal in the second period, and wherein the off-clock signal in the first period is substantially the same as the off-clock signal in the second period.

15. The electronic device of claim 14, wherein a frequency of the on-clock signal in the first period is substantially equal to a frequency of the on-clock signal in the second period.

16. The electronic device of claim 14, wherein a quantity of pulses of the on-clock signal in a period between two adjacent pulses of the common signal is constant.

17. The electronic device of claim 14, wherein the common signal comprises first pulses having a turn-on voltage level, wherein the first pulses are repeated at a first time interval, wherein the on-clock signal comprises second pulses having the turn-on voltage level in a period in which the common signal has a turn-off voltage level, and wherein the second pulses are repeated at a second time interval that is shorter than the first time interval in the period in which the common signal has the turn-off voltage level.

18. The electronic device of claim 14, wherein the common signal comprises first pulses having a turn-on voltage level, and the first pulses are repeated at a first time interval, wherein the on-clock signal comprises second pulses having the turn-on voltage level in a period in which the common signal has a turn-off voltage level, and the second pulses are repeated at a second time interval that is shorter than the first time interval in the period in which the common signal has the turn-off voltage level, wherein the off-clock signal comprises third pulses having the turn-on voltage level in the period in which the common signal has the turn-off voltage level, and wherein the off-clock signal has a phase delayed by p−0.5 times of the second time interval from the on-clock signal, where p is a positive integer.

19. The electronic device of claim 18, wherein the clock generator is configured to generate the clock signals based on triggering of the on-clock signal and the off-clock signal having opposite polarities, wherein the clock generator is configured to generate the clock signals based on rising edges of the second pulses of the on-clock signal and falling edges of the third pulses of the off-clock signal, wherein rising edges of the clock signals appear at a same time as those of the second pulses, and wherein falling edges of the clock signals appear at a same time as those of the third pulses.

20. The electronic device of claim 19, wherein the common signal comprises at least one of the first pulses in the second period.

21. The electronic device of claim 14, wherein the clock signals output from the clock generator comprise a first clock signal and a second clock signal, and wherein the first clock signal and the second clock signal have a common pulse at a same time in the second period.

22. The electronic device of claim 14, wherein the clock generator comprises:

a masking circuit configured to generate a modulated on-clock signal by masking at least some pulses of the on-clock signal based on the enable signal having the second voltage level;

a first clock generation circuit configured to generate reference clock signals based on the modulated on-clock signal;

a second clock generation circuit configured to generate a common pulse based on the enable signal having the second voltage level and the common signal; and a third clock generation circuit configured to generate the clock signals by inserting the common pulse into the reference clock signals.

23. The electronic device of claim 22, wherein at least some of the clock signals overlap with a period in which the enable signal has the second voltage level.

24. The electronic device of claim 14, wherein the clock generator comprises a plurality of level shifters configured to respectively generate some of the clock signals, wherein the on-clock signal and the common signal are commonly provided to the plurality of level shifters, and wherein the enable signal is individually provided to the plurality of level shifters.

25. The electronic device of claim 24, wherein the enable signal comprises a plurality of sub-enable signals, and wherein the sub-enable signals have a same waveform having different phases.

26. The electronic device of claim 14, wherein the gate driver comprises a plurality of stages configured to respectively generate the gate signals, wherein each stage of the plurality of stages is configured to generate a carry signal based on a previous carry signal of a previous stage and a carry clock signal, and to generate a scan signal based on the previous carry signal and a scan clock signal, wherein the scan signal is included in one or more of the gate signals, wherein the carry clock signal and the scan clock signal are included in the clock signals, and wherein the clock generator comprises:

a first sub-level shifter configured to generate the scan clock signal based on the on-clock signal, the enable signal, and the common signal; and a second sub-level shifter configured to generate the carry clock signal based on the on-clock signal and the enable signal.

27. The electronic device of claim 26, wherein the second sub-level shifter comprises:

a masking circuit configured to generate a modulated on-clock signal by masking at least some pulses of the on-clock signal based on the enable signal having the second voltage level; and a first clock generation circuit configured to generate the carry clock signal based on the modulated on-clock signal.

28. The electronic device of claim 14, wherein the gate driver is configured to concurrently generate the gate signals having a turn-on voltage level, based on the clock signals having the same phase in the second period.

29. The electronic device of claim 28, wherein the data driver is further configured to provide the black data signal corresponding to a black image to at least some of the pixels in the second period.

* * * * *